United States Patent
Andrews et al.

(10) Patent No.: US 9,096,450 B2
(45) Date of Patent: Aug. 4, 2015

(54) APPARATUS AND METHOD FOR TREATING AQUEOUS SOLUTIONS AND CONTAMINANTS THEREIN

(71) Applicant: AquaMost, Inc., Madison, WI (US)

(72) Inventors: Edward Andrews, Brookfield, WI (US); Terence P. Barry, Middleton, WI (US); Craig Doolittle, Monona, WI (US); David Kapsos, McFarland, WI (US); Jake Myre, Beaver Dam, WI (US); Alan Carlson, Columbus, WI (US); Anton Asmuth, Madison, WI (US)

(73) Assignee: AquaMost, Inc., Madison, WI (US)

( * ) Notice: Subject to any disclaimer, the term of this patent is extended or adjusted under 35 U.S.C. 154(b) by 0 days.

(21) Appl. No.: 14/177,314

(22) Filed: Feb. 11, 2014

(65) Prior Publication Data
US 2014/0224648 A1      Aug. 14, 2014

Related U.S. Application Data

(60) Provisional application No. 61/763,336, filed on Feb. 11, 2013, provisional application No. 61/782,969, filed on Mar. 14, 2013, provisional application No. 61/812,990, filed on Apr. 17, 2013, provisional application No. 61/930,337, filed on Jan. 22, 2014.

(51) Int. Cl.
*C02F 1/461* (2006.01)
*C02F 1/32* (2006.01)
(Continued)

(52) U.S. Cl.
CPC .............. *C02F 1/4672* (2013.01); *C02F 1/325* (2013.01); *C02F 1/725* (2013.01); *C02F 2001/46142* (2013.01); *C02F 2201/3227* (2013.01); *C02F 2209/02* (2013.01); *C02F 2209/42* (2013.01); *C02F 2305/10* (2013.01)

(58) Field of Classification Search
CPC ...... C02F 1/325; C02F 1/46104; C02F 1/467; C02F 2001/46142; C02F 2201/3227
See application file for complete search history.

(56) References Cited

U.S. PATENT DOCUMENTS

| | | | |
|---|---|---|---|
| 2,282,024 | A | 5/1942 | Bitner |
| 4,042,758 | A | 8/1977 | Weinstein et al. |
| 4,181,593 | A | 1/1980 | McKinzie et al. |

(Continued)

FOREIGN PATENT DOCUMENTS

| | | |
|---|---|---|
| CA | 2632788 A1 | 11/2009 |
| CN | 2558656 Y | 6/2002 |

(Continued)

OTHER PUBLICATIONS

Abeysinghe et al., 1996, Biofilters for Water Reuse in Aquaculture, Water Sci. Technol. 34:253-260.

(Continued)

*Primary Examiner* — Nicholas A Smith
(74) *Attorney, Agent, or Firm* — Boardman & Clark LLP

(57) ABSTRACT

The present disclosure is generally directed to devices and methods of treating aqueous solutions to help remove or otherwise reduce levels, concentrations or amounts of one or more contaminants. The present disclosure relates to a system and apparatus which is adapted to receive components including at least one counterelectrode (e.g. cathode) and at least one photoelectrode (e.g. anode) provided or arranged around at least one UV light source, and/or receive, contain and/or circulate fluid or aqueous solution.

20 Claims, 18 Drawing Sheets

(51) Int. Cl.
*C02F 1/467* (2006.01)
*C02F 1/72* (2006.01)

(56) References Cited

U.S. PATENT DOCUMENTS

| | | |
|---|---|---|
| 4,349,765 A | 9/1982 | Brandli |
| 4,471,036 A | 9/1984 | Skotheim |
| 4,496,440 A | 1/1985 | Campbell et al. |
| 4,521,499 A | 6/1985 | Switzer |
| 4,592,807 A | 6/1986 | Switzer |
| 4,793,910 A | 12/1988 | Smotkin et al. |
| 4,908,109 A | 3/1990 | Wright |
| 5,022,970 A | 6/1991 | Cook |
| 5,035,784 A | 7/1991 | Anderson |
| 5,116,582 A | 5/1992 | Cooper et al. |
| 5,137,607 A | 8/1992 | Anderson et al. |
| 5,215,943 A | 6/1993 | Anderson et al. |
| 5,227,342 A | 7/1993 | Anderson |
| 5,308,454 A | 5/1994 | Anderson et al. |
| 5,395,522 A | 3/1995 | Melanson et al. |
| 5,439,624 A | 8/1995 | Anderson |
| 5,449,466 A | 9/1995 | Peebles et al. |
| 5,543,034 A | 8/1996 | Hilbertz |
| 5,603,843 A | 2/1997 | Snee |
| 5,616,152 A | 4/1997 | Velasquez |
| 5,622,791 A | 4/1997 | Shackle |
| 5,712,037 A | 1/1998 | Anderson |
| 5,736,023 A | 4/1998 | Gallagher et al. |
| 5,846,390 A | 12/1998 | Eki et al. |
| 5,858,199 A | 1/1999 | Hanak |
| 5,932,111 A | 8/1999 | Christensen et al. |
| 5,935,522 A | 8/1999 | Swerdlow et al. |
| 5,963,417 A | 10/1999 | Anderson et al. |
| 6,074,072 A | 6/2000 | Parsons |
| 6,136,186 A | 10/2000 | Gonzalez-Martin et al. |
| 6,159,421 A | 12/2000 | Fujii |
| 6,180,014 B1 | 1/2001 | Salama |
| 6,218,035 B1 | 4/2001 | Fuglevand et al. |
| 6,261,464 B1 | 7/2001 | Herrington et al. |
| 6,379,560 B1 | 4/2002 | Tilp |
| 6,409,893 B1 | 6/2002 | Holzbock |
| 6,409,928 B1 | 6/2002 | Gonzalez et al. |
| 6,524,447 B1 | 2/2003 | Carmignani et al. |
| 6,547,951 B1 | 4/2003 | Maekawa |
| 6,645,366 B2 | 11/2003 | Iseki et al. |
| 7,008,473 B2 | 3/2006 | Butters |
| 7,230,255 B2 | 6/2007 | Shim |
| 7,326,330 B2 | 2/2008 | Herrington et al. |
| 7,425,272 B2 | 9/2008 | Butters et al. |
| 7,683,343 B2 | 3/2010 | Schiene et al. |
| 7,862,700 B2 | 1/2011 | Wilkins et al. |
| 8,398,828 B1 | 3/2013 | Winkie |
| 8,568,573 B2 | 10/2013 | Winkie et al. |
| 8,658,035 B2 | 2/2014 | Barry et al. |
| 8,658,046 B2 | 2/2014 | Barry et al. |
| 8,663,471 B1 | 3/2014 | Barry et al. |
| 2001/0004962 A1 | 6/2001 | Hirota et al. |
| 2001/0042682 A1 | 11/2001 | Weres et al. |
| 2002/0037240 A1 | 3/2002 | Okada et al. |
| 2002/0185080 A1 | 12/2002 | Ortiz |
| 2003/0066750 A1 | 4/2003 | Wu |
| 2004/0020861 A1 | 2/2004 | Lehmann et al. |
| 2004/0022700 A1 | 2/2004 | Kim et al. |
| 2005/0014066 A1 | 1/2005 | Shimamune |
| 2005/0051439 A1 | 3/2005 | Jang |
| 2005/0249659 A1 | 11/2005 | Flynn et al. |
| 2006/0060787 A1 | 3/2006 | Herrington et al. |
| 2006/0123885 A1 | 6/2006 | Yates et al. |
| 2006/0124442 A1 | 6/2006 | Valpey et al. |
| 2006/0144700 A1 | 7/2006 | Carson et al. |
| 2007/0020158 A1 | 1/2007 | Hashimoto et al. |
| 2007/0108056 A1 | 5/2007 | Nyberg et al. |
| 2007/0131621 A1 | 6/2007 | Denton |
| 2007/0205097 A1 | 9/2007 | Schaefer |
| 2007/0251811 A1 | 11/2007 | Sahle-Demessie et al. |
| 2007/0272877 A1 | 11/2007 | Tribelsky et al. |
| 2008/0050471 A1 | 2/2008 | Omasa |
| 2008/0121531 A1 | 5/2008 | Anderson et al. |
| 2008/0156658 A1 | 7/2008 | Herrington et al. |
| 2008/0170971 A1 | 7/2008 | Bergeron et al. |
| 2008/0220535 A1 | 9/2008 | LeBoeuf et al. |
| 2008/0259338 A1 | 10/2008 | Sanchez et al. |
| 2009/0130748 A1 | 5/2009 | Uphoff |
| 2009/0154060 A1 | 6/2009 | Anderson et al. |
| 2009/0281480 A1 | 11/2009 | Orlebeke et al. |
| 2009/0314711 A1 | 12/2009 | Barry et al. |
| 2009/0320894 A1 | 12/2009 | Angluli et al. |
| 2010/0201239 A1 | 8/2010 | Mostoller et al. |
| 2010/0209294 A1 | 8/2010 | Owen et al. |
| 2010/0270167 A1 | 10/2010 | McFarland |
| 2010/0294726 A1 | 11/2010 | Butters et al. |
| 2010/0326833 A1 | 12/2010 | Messalem et al. |
| 2011/0114506 A1 | 5/2011 | Fletcher |
| 2011/0180423 A1 | 7/2011 | Barry et al. |
| 2011/0215055 A1* | 9/2011 | Baron .................. 210/748.1 |
| 2012/0031852 A1 | 2/2012 | Aglietto |

FOREIGN PATENT DOCUMENTS

| | | |
|---|---|---|
| CN | 1538939 A | 8/2002 |
| CN | 201031159 Y | 3/2007 |
| CN | 101033105 A | 9/2007 |
| CN | 101172674 A | 10/2007 |
| CN | 100558652 C | 11/2007 |
| CN | 101219371 A | 7/2008 |
| CN | 101543771 A | 9/2009 |
| CN | 101584996 A | 11/2009 |
| CN | 101913678 A | 8/2010 |
| CN | 101863548 A | 10/2010 |
| DE | 19602947 A1 | 1/1996 |
| EP | 2394963 A1 | 12/2011 |
| JP | 7-39273 | 2/1995 |
| JP | 2000-201569 A | 7/2000 |
| JP | 2000-210570 A | 8/2000 |
| JP | 2001-29747 A | 2/2001 |
| JP | 2001-62469 A | 3/2001 |
| JP | 2001-136862 A | 5/2001 |
| JP | 2001-170204 A | 6/2001 |
| JP | 2002-59177 A | 2/2002 |
| JP | 2003-190777 A | 7/2003 |
| JP | 2003-200043 A | 7/2003 |
| JP | 2003-200178 A | 7/2003 |
| JP | 2004-154742 A | 6/2004 |
| JP | 2005-152815 A | 6/2005 |
| JP | 2005-193216 A | 7/2005 |
| JP | 2006-61886 A | 3/2006 |
| JP | 2006-230345 | 9/2006 |
| JP | 2006-526500 A | 11/2006 |
| JP | 2007-69124 A | 3/2007 |
| JP | 2007-167029 A | 7/2007 |
| JP | 2011-55795 A | 3/2011 |
| KR | 10-2010-0003902 | 1/2010 |
| KR | 20-2011-0010953 | 11/2011 |
| WO | WO 2006/027659 | 3/2006 |
| WO | WO 2012123412 A1 * | 9/2012 |

OTHER PUBLICATIONS

Asadi et al., 2006, Degradation of Aqueous Methyl tert-Butyl Ether by Photochemical, Biological, and Their Combined Processes, Int'l. Journal of Photoenergy, 2006: 1-7.

Baram et al., 2009, Enhanced inactivation of *E. coli* bacteria using immobilized porous TiO2 photoelectrocatalysis, Electrochimica Acta 54 (2009) 3381-3386.

Barreto et al., 1995, Photocatalytic Degradation of Methyl-tert-Butyl Ether in TiO2 Slurries: A Proposed Reaction Scheme, Wat. Res. vol. 29, No. 5, pp. 1243-1248.

Bradley et al., 1999, Aerobic Mineralization of MTBE and tert-Butyl Alcohol by Stream-Bed Sediment Microorganisms, Environ. Sci. Technol. 33:1877-1879.

Candal et al., 1998, TiO2—Mediated Photoelectrocatalytic Purification of Water, J. Adv. Oxid. Technol. vol. 3, No. 3, pp. 270-276.

(56) References Cited

OTHER PUBLICATIONS

Candal et al., 1999, Titanium-Supported Titania Photoelectrodes Made by Sol-Gel Processes, J. of Env. Engin., October, pp. 906-912.

Candal et al., 2000, Effects of pH & Applied Pot. on Photocurrent and Oxid. Rate of Saline Solns. of Formic Acid in a Photoelectrocat. Reactor, Env. Sci. Tech. 34:3443-3451.

Cater et al., 2000, UV/H2O2 Treatment of Methyl tert-Butyl Ether in Contaminated Waters, Environ. Sci. Technol. 34: 659-662.

Chang et al., 2000, Kinetics of Methyl Tert-Butyl Ether Degradation & By-Product Formation During UV/Hydrogen Peroxide Water Treatment, Water Res. vol. 34, No. 8,p. 2223-2340.

Chen, 2004, Electrochemical Technologies in Wastewater Treatment, Sep. Purif. Technol. 38:11-41.

Cheng et al., 2007, Models of Hypochlorite production in electrochemical reactors with plate and porous anodes, J Appl Electrochem 37:1203-1217.

Chiang et al., 1996, Photodegradation of Chlorinated Organic Wastes with n-TiO2 Promoted by P-CuO, Journal of the Chinese Chemical Society, 43: 21-27.

Chiang et al., 1995, Indirect Oxidation Effects in Electrochemical Oxidation Treatment of Landfill Leachate, Water Res. 29:671-678.

Cho et al., 2008, Meas. of OH radical CT for inactivating *Cryptosporidium parvum* using photo/ferrioxalate and photo/TiO2 systems, Jrnl. of Applied Microbiology, 104: 759-766.

Cho et al., 2010, Mechanisms of *Escherichia coli* inactivation by several disinfectants, Water Research 44: 3410-3418.

Christensen et al., 2003, Photoelectrocatalytic and photocatalytic disinfection of *E. coli* suspensions by titanium dioxide, Applied Catalysis B: Environmental 41: 371-386.

Church et al., 1997, Method for Determination of Methyl tert-Butyl Ether and Its Degradation Products in Water, Environmental Science & Technology, 31: 3723-3726.

Chu et al., 2004, The photocatalytic degradation of dicamba in TiO2 suspensions with the help of hyd. perox. by different near UV irradiations, Water Research 38:1037-1043.

Clancy et al., 2000, Using UV to Inactivate *Cryptosporidium*, American Water Works Association Journal; Sep., pp. 97-104, 107.

Cooper et al., 1994, Process Options for Phosphorus and Nitrogen Removal from Wastewater, J. Inst. Water Envrion. Manag. 8:84-92.

Crittenden et al., 1996, Solar detoxification of fuel-contaminated groundwater using fixed-bed photocatalysts, Water Environment Resesrch, vol. 68, No. 3, pp. 270-278.

Czarnetzki, et al., 1992, Formation of Hypochlorite, Chlorate, and Oxygen During NaCl Electrolysis from Alkaline-Solutions at a RuO2/TiO2 Anode, J. Appl. Electro. 22:315-324.

Davis et al., 2000, Alternative Sorbents for Removing MTBE from Gasoline-Contaminated Groundwater, J. Environ. Eng., 126: 354.

Delos Reyes, et al., 1996, Combination of a Bead Filter and Rotating Biological Contactor in a Recirculating Fish Culture System, Aquacultural Engineering vol. 15, pp. 27-39.

Dunlop et al., 2008, Photocatalytic inactivation of *Clostridium perfringens* spores on TiO2 electrodes, Journal of Photochemistry and Photobiology A: Chemistry 196: 113-119.

Egerton et al., 2006, Photoelectrocatalysis by titanium dioxide for water treatment, Int. J. Environment and Pollution, vol. 27, Nos. 1/2/3, pp. 2-19.

Eslami et al., 2008, Photocatalytic Degradation of methyl tert-butyl ether (MTBE) in Contaminated Water by ZnO Nanoparticles, J Chem Technol Biotechnol 83:1447-1453.

Fraga et al., 2009, Evaluation of the photoelectrocatalytic method for oxidi. chl. & simult. removal of microcystin toxins in surface waters, Electrochimica Acta 54:2069-2076.

Fujishima et al., 1998, Interfacial photochemistry: Fundamentals and applications, Pure & Appl. Chem.,vol. 70, No. 11, pp. 2177-2187.

Garrett et al., 1986, MTBE As Grd. Water Contam., Procds. Of MWWA/API Conf. on Petro. Hydrocarb. & Org. Chem. in Grd. Water, Hou. Tex. Nov. 12-14, Dublin, OH, NWWA, p. 227-238.

Gerischer, 1993,Photoelectrochemical Catalysis of the Oxidation of Organic Mol. by Oxygen on Small Semiconductor Particles with TiO2 as an Example, Electrochimica Acta, 38:3-9.

Gupta et al., 1995, Toxicity of Methyl Tertiary Butyl Ether to *Daphnia Magna* and *Photobacterium phosphoreum*, Bull. Environ. Contam. Toxicol., 55:618-620.

Helmer et al., 1998, Simultaneous Nitrification/Dentrification in an Anerobic Biofilm System, Wat. Sci. Tech., vol. 37. No. 4-5. pp. 183-187.

Hoffman et al., 1994, Photocatalytic Production of H2O2 and Organic Peroxide on Quantum-Sized Semiconductor Colloids, Environ. Sci. Technol. 28: 776-785.

Hoffman et al., 1995, Environmental Applications of Semiconductor Photocatalysis, Chem. Rev. 1995, 95, pp. 69-96.

Ip et al., 2001, Ammonia Toxicity, Tolerance, and Excretion, Fish Physiology, vol. 20: Nitrogen Excretion, pp. 109-148.

Johnson et al., 2000, MTBE to What Extent Will Past Releases Contaminate Community Water Supply Wells?, Environmental Science & Technology, May 1, 2000, pp. 2-9.

Kaneko et al., 2006, Photoelectrochemical reaction of biomass & bio-related compounds w/nanoporous TiO2 film photoanode and O2-reducing cathode, Electrochem. Comm. 8:336-340.

Keller, et al., 1998, An integral cost-benefit analysis of gaso. form. mtg. Cali. Phase II Reformulated Gaso. requirements, Cost-Benefit Analysis of Gaso. Formu., pp. 1-56.

Kim et al., 1994, Photoelectrocatalytic Degradation of Formic Acid Using a Porous Ti02 Thin-Film Electrode, Environ. Sci. Technol. 1994, 28:479-483.

Kim et al., 1995, Effects of Firing Temperature on Photocatalytic and Photoelectrocatalytic Properties of Ti02, J. Environ. Engin., Aug. 1995, pp. 590-594.

Knudson, 1985, Photoreactivation of UV-Irradiated *Legionella pneumophila* and Other *Legionella* Species, Applied and Environmental Microbiology, vol. 49, No. 4, p. 975-980.

Kropp et al., 2009, A device that converts aqueous ammonia into nitrogen gas, Aquacultural Engineering 41 (2009) pp. 28-34.

Lee et al., 2002, Residual Chlorine Distribution and Disinfection during Electrochemical Removal of Dilute Ammonia from an Aqueous Solution, J. Chem. Eng. Japan, 35:285-289.

Li et al., 2005, Photoelectrocatalytic degradation of bisphenol A in aqueous solution using a Au—TiO2/ITO film, Journal of Applied Electrochemistry (2005) 35:741-750.

Liang, et al., 1999, Oxidation of MTBE by Ozone and Peroxone Processes, J. Am. Water Works Assoc. vol. 91, Issue 6, pp. 104-114.

Lin, et al., 1996, Photodegradation of Aroclor 1254 Using Simulated Sunlight and Various Sensitizers, Bull. Environ. Contam. Toxicol. (1996) 56:566-570.

Lin, et al., 1997, Electrochemical Nitrite and Ammonia Oxidation in Sea Water, J. Environ. Sci. Health, A32(8), 2125-2138.

Lin, et al., 1996, Electrochemical Removal of Nitrite and Ammonia for Aquaculture, Wat. Res. vol. 30, pp. 715-721.

Long et al., 2004, A comparison of the survival of F+RNA and F+DNA coli phages in lake water microcosms, J. Water and Health, vol. 2, Issue: 1, Mar. 2004, pp. 15-22.

Malone et al., 2000, Use of Floating Bed Filters to Recondition Recirculating Waters in Warm Water Aquaculture Product Systems, Aquacul. Eng. 22:57-73.

Mamane et al., 2007, Inactivation of *E. coli*, *B. subtilis* spores, and MS2, T4, and T7 phage using UV/H2O2 advanced oxidation, Journal of Hazardous Materials 146 (2007) 479-486.

Matthews, 1988, An Adsorption Water Purifies with in Situ Photocatalytic Regeneration, Journal of Catalysis 113: 549-555.

Matthews, 1988, Kinetics of Photocatalytic Oxidation of Organic Solutes over Titanium Dioxide, Journal of Catalysis 111: 264-272.

Matthews, 1986, Photo-Oxidation of Organic Material in Aqueous Suspensions of Titanium Dioxide, Wat. Res. vol. 20, No. 5, pp. 569-578.

McClure et al., 2000, A big advance in cleaning up small MTBE levels, Environmental Protection, May 2000, pp. 20, 22-25.

Mofidi et al., 2002,The effect of UV light on the inactivation of *Giardia lamblia* & *Giardia muris* cysts as determined by animal infectivity assay, Water Research 36:2098-2108.

Ollis et al., 1991, Destruction of Water Contaminants, Environ. Sci. Technol., vol. 25, No. 9, 1991, pp. 1522-1529.

(56) References Cited

OTHER PUBLICATIONS

Pavasupree et al., 2006, Structural, Photocatalytic Activity & Photovoltaic Prop. of Mesoporous Anatase Titania Nanopowders Prep. by Hydrothermal Method, Nov. 21-23 Thailand.

Pereira et al., 2008, Comparing Efficacy of Cl., ClO2, & O3 in Inactivation of *Cryptosporidium parvum* in Water from Parana State, S. Brazil, Appl Biochem Biotechnol 151:464-473.

Randall, et al., 2002, Ammonia Toxicity in Fish, Marine Pollution Bulletin 45:17-23.

Rice et al., 1999, Chlorine Inactivation of *Escherichia coli* O157:H7, Emerging Infectious Diseases, vol. 5, No. 3., May-Jun. 1999, pp. 461-463.

Russo et al., 1991, Toxicity of Ammonia, Nitrite, and Nitrate to Fishes, Aquaculture and Water Quality, pp. 58-89.

Sakulkhaemaruethai et al., 2005, Photocatalytic activity of titania nanocrystals prep. by surfactant-assisted templating method . . . , Materials Letters 59: 2965-2968.

Selcuk et al., 2005, Effect of pH, charge separation and ox. concentration in photoelectro. systems: active chlorine production & chlorate formation, Deslination, 176:219-227.

Selli et al., 2005, Degradation of methyl tert-butyl ether in water: effects of the combined use of sonolysis and photocatalysis, Ultrasonics Sonochemistry 12 (2005) 395-400.

Shang et al., 2007, MS2 Coliphage Inactivation with UV Irradiation and Free Chlorine/Monochloramine, Environmental Engineering Science, vol. 24, No. 9, pp. 1321-1332.

Squillace et al., 1996, Environmental Behavior and Fate of Methyl tert-Butyl Ether (MTBE), U.S. Geological Survey-NAWQA, pp. 1-6.

Stefan et al., 2000, Degradation Pathways during the Treatment of Methyl tert-Butyl Ether by the UV/H2O2 Process, Environ. Sci. Technol. 2000, 34:650-658.

Sun et al., 1998, Kinetics & Mechanism of Photoelect. Oxid. Nitrite Ion by Using Rutile Form TiO2/Ti Photoele. w/ High Electric Field Enhan., Ind. Eng. Chem. Res. 37:4207-4214.

Thompson et al., 2003, Detection of Infectious Human Adenoviruses in Tertiary-Treated and Ultraviolet-Disinfected Wastewater, Water Environment Research, 75:163-170.

Tomasso, 1994, Toxicity of Nitrogeneous Wastes to Aquaculture Animals, Reviews in Fisheries Science, 2(4): 291-314.

USEPA, Dec. 1997, Drinking Water Advisory: Consumer Acceptability Advice and Health Effects Analysis on Methyl Tertiary-Butyl Ether (MtBE), EPA-822-F-97-OO9, pp. 1-42.

USEPA, Jun. 2003, Ultraviolet Disinfection Guidance Manual, EPA-815-D-03-007, pp. 1-556.

USEPA, 2008, Rules Part 141—National Primary Drinking Water Regulations.

Van Rijn J, 1996, The Potential for Integrated Biological Treatment Systems in Recirculating Fish Culture—A Review, Aquaculture 139 (1996) 181-201.

Venkatesan et al., 2008, Isolation & Detection Indicator MS2 Coliphage different environ. & sea goods by PEG Precip. & GAC-UAPB-RT-PCR Meth, Adv. Biotech, Jul. 2008, pp. 26-32.

Vinodgopal, et al., 1993, Electrochem. Assist. Photocat. TiO2 Part. Film Elect. For Photocat. Degrad. of 4-Chlorophenol, J. Phys. Chem. 97:9040--9044.

Vinodgopal, et al., 1996, Nano. Semi. Films for Photocat.: Photoelec. Behay. of SnO2/TiO2 Comp. Sys. & its Role in Photocata. Degrad. of Text. Azo Dye, Chem. Mat. 8:2180-2187.

Wilkinson, 1961, A Simple Method for Determining Rate Constants and Orders of Reaction, Chemistry and Industry, pp. 1395-1397.

Wolfe et al., 1989, Inactivation of *Giardia* murls and Indicator Organisms Seeded in Surface Water Supplies by Peroxone and Ozone, Environ. Sci. Technol. 1989, 23:744-745.

Zang et al., 2005, Photocatalytic Decomposition of Methyl Tert-Butyl Ether in Aqueous Slurry of Titanium Dioxide, Applied Catalysis B: Environmental 57 (2005) 275-282.

Zanoni et al., 2004, Photoelectrocatalytic Production of ACtive Chlorine on Nanocrystalline Titanium Dioxide Thin-Film Electrodes, Environ. Sci. Technol. 38:3203-3208.

International Search Report and Written Opinion of the International Searching Authority for PCT/US2013/020308 filed Jan. 4, 2013.

International Search Report and Written Opinion of the International Searching Authority for PCT/US2012/067083 filed Nov. 29, 2012.

Translated Abstract for KR1020040066971 published Jul. 30, 2004, to Kim et al.

Amendment and Response to Office Action dated Nov. 1, 2011 for U.S. Appl. No. 12/369,219.

USPTO Final Office Action dated Nov. 1, 2011 for U.S. Appl. No. 12/369,219.

Amendment and Response to Office Action dated Jun. 16, 2011 for U.S. Appl. No. 12/369,219.

USPTO Nonfinal Office Action dated Jun. 16, 2011 for U.S. Appl. No. 12/369,219.

USPTO Nonfinal Office Action dated Feb. 25, 2013 for U.S. Appl. No. 12/977,347.

Amendment and Response to Office Action dated Feb. 25, 2013 for U.S. Appl. No. 12/977,347.

USPTO Nonfinal Office Action dated Aug. 2, 2013 for U.S. Appl. No. 13/796,310.

Amendment and Response to Office Action dated Aug. 2, 2013 for U.S. Appl. No. 13/796,310.

USPTO Final Office Action dated Nov. 14, 2013 for U.S. Appl. No. 13/796,310.

Amendment and Response to Final Office Action dated Nov. 14, 2013 for U.S. Appl. No. 13/796,310.

USPTO Nonfinal Office Action dated Jul. 30, 2013 for U.S. Appl. No. 13/899,993.

Amendment and Response to Office Action dated Jul. 30, 2013 for U.S. Appl. No. 13/899,993.

USPTO Final Office Action dated Nov. 7, 2013 for U.S. Appl. No. 13/899,993.

Amendment and Response to Final Office Action dated Nov. 7, 2013 for U.S. Appl. No. 13/899,993.

USPTO Nonfinal Office Action dated Aug. 5, 2013 for U.S. Appl. No. 13/689,089.

Amendment and Response to Office Action dated Aug. 5, 2013 for U.S. Appl. No. 13/689,089.

USPTO Final Office Action dated Nov. 7, 2013 for U.S. Appl. No. 13/689,089.

Amendment and Response to Final Office Action dated Nov. 7, 2013 for U.S. Appl. No. 13/689,089.

USPTO Final Office Action dated Aug. 30, 2013 for U.S. Appl. No. 12/977,347.

Amendment and Response to Final Office Action dated Aug. 30, 2013 for U.S. Appl. No. 12/977,347.

Advisory Action Before Filing of an Appeal Brief dated Nov. 5, 2013 for U.S. Appl. No. 12/977,347.

Appeal Brief dated Jan. 2, 2014 for U.S. Appl. No. 12/977,347.

International Search Report and Written Opinion of the International Searching Authority dated May 14, 2014, PCT/US2014/015628 filed Feb. 10, 2014.

* cited by examiner

APPARATUS AND METHOD FOR TREATING AQUEOUS SOLUTIONS AND CONTAMINANTS THEREIN

CROSS REFERENCE TO RELATED APPLICATIONS

This application claims priority to U.S. Provisional Patent Application Ser. No. 61/763,336 filed Feb. 11, 2013, U.S. Provisional Patent Application Ser. No. 61/782,969 filed Mar. 14, 2013, U.S. Provisional Patent Application Ser. No. 61/812,990 filed Apr. 17, 2013, and U.S. Provisional Patent Application Ser. No. 61/930,337 filed Jan. 22, 2014, each of which is hereby incorporated herein by reference in its entirety.

BACKGROUND

Aqueous solutions often contain one or more contaminants. Such aqueous solutions include, but are not limited to, hydraulic fracturing fluid, hydraulic fracturing backflow water, high-salinity solutions, groundwater, seawater, wastewater, drinking water, aquaculture (e.g., aquarium water and aquaculture water), ballast water, and textile industry dye wastewater. Further information on example aqueous solutions follows.

Hydraulic fracturing fluid includes any fluid or solution utilized to stimulate or produce gas or petroleum, or any such fluid or solution after it is used for that purpose.

Groundwater includes water that occurs below the surface of the Earth, where it occupies spaces in soils or geologic strata. Groundwater may include water that supplies aquifers, wells and springs.

Wastewater may be any water that has been adversely affected in quality by effects, processes, and/or materials derived from human or non-human activities. For example, wastewater may be water used for washing, flushing, or in a manufacturing process, that contains waste products. Wastewater may further be sewage that is contaminated by feces, urine, bodily fluids and/or other domestic, municipal or industrial liquid waste products that is disposed of (e.g., via a pipe, sewer, or similar structure or infrastructure or via a cesspool emptier). Wastewater may originate from blackwater, cesspit leakage, septic tanks, sewage treatment, washing water (also referred to as "graywater"), rainfall, groundwater infiltrated into sewage, surplus manufactured liquids, road drainage, industrial site drainage, and storm drains, for example.

Drinking water includes water intended for supply, for example, to households, commerce and/or industry. Drinking water may include water drawn directly from a tap or faucet. Drinking water may further include sources of drinking water supplies such as, for example, surface water and groundwater.

Aquarium water includes, for example, freshwater, seawater, and saltwater used in water-filled enclosures in which fish or other aquatic plants and animals are kept or intended to be kept. Aquarium water may originate from aquariums of any size such as small home aquariums up to large aquariums (e.g., aquariums holding thousands to hundreds of thousands of gallons of water).

Aquaculture water is water used in the cultivation of aquatic organisms. Aquaculture water includes, for example, freshwater, seawater, and saltwater used in the cultivation of aquatic organisms.

Ballast water includes water, such as freshwater and seawater, held in tanks and cargo holds of ships to increase the stability and maneuverability during transit. Ballast water may also contain exotic species, alien species, invasive species, and/or nonindiginous species of organisms and plants, as well as sediments and contaminants.

A contaminant may be, for example, an organism, an organic chemical, an inorganic chemical, and/or combinations thereof. More specifically, "contaminant" may refer to any compound that is not naturally found in an aqueous solution. Contaminants may also include microorganisms that may be naturally found in an aqueous solution and may be considered safe at certain levels, but may present problems (e.g., disease and/or other health problems) at different levels. In other cases (e.g., in the case of ballast water), contaminants also include microorganisms that may be naturally found in the ballast water at its point of origin, but may be considered non-native or exotic species. Moreover, governmental agencies such as the United States Environmental Protection Agency, have established standards for contaminants in water.

A contaminant may include a material commonly found in hydraulic fracturing fluid before or after use. For example, the contaminant may be one or more of the following or combinations thereof: diluted acid (e.g., hydrochloric acid), a friction reducer (e.g., polyacrylamide), an antimicrobial agent (e.g., glutaraldehyde, ethanol, and/or methanol), scale inhibitor (e.g., ethylene glycol, alcohol, and sodium hydroxide), sodium and calcium salts, barium, oil, strontium, iron, heavy metals, soap, bacteria, etc. A contaminant may include a polymer to thicken or increase viscosity to improve recovery of oil. A contaminant may also include guar or guar gum, which is commonly used as a thickening agent in many applications in oil recovery, the energy field, and the food industry.

A contaminant may be an organism or a microorganism. The microorganism may be for example, a prokaryote, a eukaryote, and/or a virus. The prokaryote may be, for example, pathogenic prokaryotes and fecal coliform bacteria. Example prokaryotes may be *Escherichia, Brucella, Legionella*, sulfate reducing bacteria, acid producing bacteria, *Cholera* bacteria, and combinations thereof.

Example eukaryotes may be a protist, a fungus, or an algae. Example protists (protozoans) may be *Giardia, Cryptosporidium*, and combinations thereof. A eukaryote may also be a pathogenic eukaryote. Also contemplated within the disclosure are cysts of cyst-forming eukaryotes such as, for example, *Giardia*.

A eukaryote may also include one or more disease vectors. A "disease vector" refers any agent (person, animal or microorganism) that carries and transmits an infectious pathogen into another living organism. Examples include, but are not limited to, an insect, nematode, or other organism that transmits an infectious agent. The life cycle of some invertebrates such as, for example, insects, includes time spent in water. Female mosquitoes, for example, lay their eggs in water. Other invertebrates such as, for example, nematodes, may deposit eggs in aqueous solutions. Cysts of invertebrates may also contaminate aqueous environments. Treatment of aqueous solutions in which a vector (e.g., disease vector) may reside may thus serve as a control mechanism for both the disease vector and the infectious agent.

A contaminant may be a virus. Example viruses may include a waterborne virus such as, for example, enteric viruses, hepatitis A virus, hepatitis E virus, rotavirus, and MS2 coliphage, adenovirus, and norovirus.

A contaminant may include an organic chemical. The organic chemical may be any carbon-containing substance according to its ordinary meaning. The organic chemical may be, for example, chemical compounds, pharmaceuticals, over-the-counter drugs, dyes, agricultural pollutants, industrial pollutants, proteins, endocrine disruptors, fuel oxygenates, and/or personal care products. Examples of organic chemicals may include acetone, acid blue 9, acid yellow 23, acrylamide, alachlor, atrazine, benzene, benzo(a)pyrene, bromodichloromethane, carbofuran, carbon tetrachloride, chlorobenzene, chlorodane, chloroform, chloromethane, 2,4-dichlorophenoxyacetic acid, dalapon, 1,2-dibromo-3-chloropropane, o-dichlorobenzene, p-dichlorobenzene, 1,2-dichloroethane, 1,1-dichloroethylene, cis-1,2-dichloroethylene, trans-1,2-dichloroethylene, dichlormethane, 1,2-dichloropropane, di(2-ethylhexyl)adipate, di(2-ethylhexyl)phthalate, dinoseb, dioxin (2,3,7,8-TCDD), diquat, endothall, endrin, epichlorohydrin, ethylbenzene, ethylene dibromide, glyphosate, a haloacetic acid, heptachlor, heptachlor epoxide, hexachlorobenzene, hexachlorocyclopentadiene, lindane, methyl-tertiary-butyl ether, methyoxychlor, napthoxamyl (vydate), naphthalene, pentachlorophenol, phenol, picloram, isopropylbenzene, N-butylbenzene, N-propylbenzene, Sec-butylbenzene, polychlorinated biphenyls (PCBs), simazine, sodium phenoxyacetic acid, styrene, tetrachloroethylene, toluene, toxaphene, 2,4,5-TP (silvex), 1,2,4-trichlorobenzene, 1,1,1-trichloroethane, 1,1,2-trichloroethane, trichloroethylene, a trihalomethane, 1,2,4-trimethylbenzene, 1,3,5-trimethylbenzene, vinyl chloride, o-xylene, m-xylene, p-xylene, an endocrine disruptor, a G-series nerve agent, a V-series nerve agent, bisphenol-A, bovine serum albumin, carbamazepine, cortisol, estradiol-17β, gasoline, gelbstoff, triclosan, ricin, a polybrominated diphenyl ether, a polychlorinated diphenyl ether, and a polychlorinated biphenyl. Methyl tert-butyl ether (also known as, methyl tertiary-butyl ether) is a particularly applicable organic chemical contaminant.

A contaminant may include an inorganic chemical. More specifically, the contaminant may be a nitrogen-containing inorganic chemical such as, for example, ammonia ($NH_3$) or ammonium ($NH_4$). Contaminants may include non-nitrogen-containing inorganic chemicals such as, for example, aluminum, antimony, arsenic, asbestos, barium, beryllium, bromate, cadmium, chloramine, chlorine, chlorine dioxide, chlorite, chromium, copper, cyanide, fluoride, iron, lead, manganese, mercury, nickel, nitrate, nitrite, selenium, silver, sodium, sulfate, thallium, and/or zinc.

A contaminant may include a radionuclide. Radioactive contamination may be the result of a spill or accident during the production or use of radionuclides (radioisotopes). Example radionuclides include, but are not limited to, an alpha photon emitter, a beta photon emitter, radium 226, radium 228, and uranium.

Various methods exist for handling contaminants and contaminated aqueous solutions. Generally, for example, contaminants may be contained to prevent them from migrating from their source, removed, and immobilized or detoxified.

Another method for handling contaminants and contaminated aqueous solutions is to treat the aqueous solution at its point-of-use. Point-of-use water treatment refers to a variety of different water treatment methods (physical, chemical and biological) for improving water quality for an intended use such as, for example, drinking, bathing, washing, irrigation, etc., at the point of consumption instead of at a centralized location. Point-of-use treatment may include water treatment at a more decentralized level such as a small community or at a household. A drastic alternative is to abandon use of the contaminated aqueous solutions and use an alternative source.

Other methods for handling contaminants and contaminated aqueous solutions are used for removing gasoline and fuel contaminants, and particularly the gasoline additive, MTBE. These methods include, for example, phytoremediation, soil vapor extraction, multiphase extraction, air sparging, membranes (reverse osmosis), and other technologies. In addition to high cost, some of these alternative remediation technologies result in the formation of other contaminants at concentrations higher than their recommended limits. For example, most oxidation methods of MTBE result in the formation of bromate ions higher than its recommended limit of 10 μg/L in drinking water (Liang et al., "Oxidation of MTBE by ozone and peroxone processes," J. Am. Water Works Assoc. 91:104 (1999)).

A number of technologies have proven useful in reducing MTBE contamination, including photocatalytic degradation with UV light and titanium dioxide (Barreto et al., "Photocatalytic degradation of methyl tert-butyl ether in $TiO_2$ slurries: a proposed reaction scheme," Water Res. 29:1243-1248 (1995); Cater et al., "UV/$H_2O_2$ treatment of MTBE in contaminated water," Environ. Sci Technol. 34:659 (2000)), oxidation with UV and hydrogen peroxide (Chang and Young, "Kinetics of MTBE degradation and by-product formation during UV/hydrogen peroxide water treatment," Water Res. 34:2223 (2000); Stefan et al., "Degradation pathways during the treatment of MTBE by the UV/$H_2O_2$ process," Environ. Sci. Technol. 34:650 (2000)), oxidation by ozone and peroxone (Liang et al., "Oxidation of MTBE by ozone and peroxone processes," J. Am. Water Works Assoc. 91:104 (1999)) and in situ and ex situ bioremediation (Bradley et al., "Aerobic mineralization of MTBE and tert-Butyl alcohol by stream bed sediment microorganisms," Environ. Sci. Technol. 33:1877-1879 (1999)).

Use of titanium dioxide (titania, $TiO_2$) as a photocatalyst has been shown to degrade a wide range of organic pollutants in water, including halogenated and aromatic hydrocarbons, nitrogen-containing heterocyclic compounds, hydrogen sulfide, surfactants, herbicides, and metal complexes (Matthews, "Photo-oxidation of organic material in aqueous suspensions of titanium dioxide," Water Res. 220:569 (1986); Matthews, "Kinetic of photocatalytic oxidation of organic solutions over titanium-dioxide," J. Catal. 113:549 (1987); Ollis et al., "Destruction of water contaminants," Environ. Sci. Technol. 25:1522 (1991)).

Irradiation of a semiconductor photocatalyst, such as titanium dioxide ($TiO_2$), zinc oxide, or cadmium sulfide, with light energy equal to or greater than the band gap energy (Ebg) causes electrons to shift from the valence band to the conduction band. If the ambient and surface conditions are correct, the excited electron and hole pair can participate in oxidation-reduction reactions. The oxygen acts as an electron acceptor and forms hydrogen peroxide. The electron donors (i.e., contaminants) are oxidized either directly by valence band holes or indirectly by hydroxyl radicals (Hoffman et al., "Photocatalytic production of $H_2O_2$ and organic peroxide on quantum-sized semi-conductor colloids," Environ. Sci. Technol. 28:776 (1994)). Additionally, ethers can be degraded oxidatively using a photocatalyst such as $TiO_2$ (Lichtin et al., "Photopromoted titanium oxide-catalyzed oxidative decomposition of organic pollutants in water and in the vapor phase," Water Pollut. Res. J. Can. 27:203 (1992)). A reaction scheme for photocatalytically destroying MTBE using UV and $TiO_2$ has been proposed, but photodegradation took place only in the presence of catalyst, oxygen, and near UV irradiation and MTBE was converted to several intermediates (tertiary-butyl formate, tertiary-butyl alcohol, acetone, and alpha-hydroperoxy MTBE) before complete mineralization (Barreto et al. "Photocatalytic degradation of methyl tert-butyl ether in $TiO_2$ slurries: a proposed reaction scheme," Water Res. 29:1243-1248 (1995)).

A more commonly used method of treating aqueous solutions for disinfection of microorganisms is chemically treating the solution with chlorine. Disinfection with chlorine, however, has several disadvantages. For example, chlorine content must be regularly monitored, formation of undesirable carcinogenic by-products may occur, chlorine has an unpleasant odor and taste, and chlorine requires the storage of water in a holding tank for a specific time period.

Aqueous solutions used for hydraulically fracturing gas wells (e.g., fracturing or frac fluids) or otherwise stimulating petroleum, oil and/or gas production also require treatment. Such solutions or frac fluids typically include one or more components or contaminants including, by way of example and without limitation, water, sand, diluted acid (e.g., hydrochloric acid), one or more polymers or friction reducers (e.g., polyacrylamide), one or more antimicrobial agents (e.g., glutaraldehyde, ethanol, and/or methanol), one or more scale inhibitors (e.g., ethylene glycol, alcohol, and sodium hydroxide), and one or more thickening agents (e.g., guar). In addition, a significant percentage of such solutions and fluids return toward the Earth surface as flowback, and later as produced water, after they have been injected into a hydrofrac zone underground. As they return toward the Earth surface, the solutions and fluids also pick up other contaminants from the earth such as salt (e.g., sodium and calcium salts). Such fluids may also include barium, oil, strontium, iron, heavy metals, soap, high concentrations of bacteria including acid producing and sulfate reducing bacteria, etc.

Aqueous solutions used for hydraulically fracturing gas wells or otherwise stimulating oil and gas production are difficult and expensive to treat for many reasons including, without limitation, the salinity of the solutions. For that reason, such fluids are often ultimately disposed of underground, offsite, or into natural water bodies. In some cases, certain states and countries will not allow fracking due to remediation concerns.

Accordingly, there is a need in the art for alternative approaches for treating aqueous solutions to remove and/or reduce amounts of contaminants. Specifically, it would be advantageous to have apparatus and/or methods for treating various aqueous solutions including hydraulic fracturing fluid, hydraulic fracturing backflow water, high-salinity water, groundwater, seawater, wastewater, drinking water, aquarium water, and aquaculture water, and/or for preparation of ultrapure water for laboratory use and remediation of textile industry dye wastewater, among others, that help remove or eliminate contaminants without the addition of chemical constituents, the production of potentially hazardous by-products, or the need for long-term storage.

SUMMARY

The present disclosure is generally directed to devices and methods of treating aqueous solutions to help remove or otherwise reduce levels or amounts of one or more contaminants. More specifically, the present disclosure relates to an assembly for removing or reducing the level of contaminants in a solution comprising: a first light source having a longitudinal axis; a plurality of second light sources provided about a line concentric to the longitudinal axis of the first light source; a first photoelectrode provided between the first light source and plurality of second light sources; a second photoelectrode provided around the second light sources; at least one counterelectrode provided between the first photoelectrode and the second photoelectrode; wherein the first photoelectrode and second photoelectrode each comprise a primarily titanium foil support with a layer of titanium dioxide provided on at least one surface the photoelectrode; and wherein the first photoelectrode, second photoelectrode and at least one counterelectrode are each coupled to a respective terminal adapted to be electrically coupled to a power supply.

The present disclosure further relates to an assembly for removing or reducing the level of contaminants in a solution comprising: a plurality of light sources spaced in a radial array between a first photoelectrode and a second photoelectrode; at least one counterelectrode provided between the first photoelectrode and the second photoelectrode; wherein the first photoelectrode and second photoelectrode each comprise a primarily titanium foil support with a layer of titanium dioxide provided on at least one surface the photoelectrode; and wherein the first photoelectrode, second photoelectrode and at least one counterelectrode are each coupled to a respective terminal adapted to be electrically coupled to a power supply.

The present disclosure further relates to an apparatus for removing or reducing the level of contaminants in a solution comprising: a housing member having first opposing end and a second opposing end and at least partially defining a cavity having a cavity wall and a cavity longitudinal axis; a first light source provided within the cavity; a first photoelectrode provided between the first light source and the cavity wall; a second photoelectrode provided between the first photoelectrode and the cavity wall; a plurality of second light sources provided between the first photoelectrode and the second photoelectrode; a counterelectrode provided between the first photoelectrode and the cavity wall; wherein the first photoelectrode and second photoelectrode each comprises a primarily titanium foil support with a layer of titanium dioxide provided on at least one surface the photoelectrode; and wherein the first photoelectrode, second photoelectrode and counterelectrode are each coupled to a respective terminal adapted to be electrically coupled to a power supply.

BRIEF DESCRIPTION OF THE DRAWINGS

The disclosure will be better understood, and features, aspects and advantages other than those set forth above will become apparent when consideration is given to the following detailed description thereof. Such detailed description makes reference to the following drawings, wherein.

Figure 1:
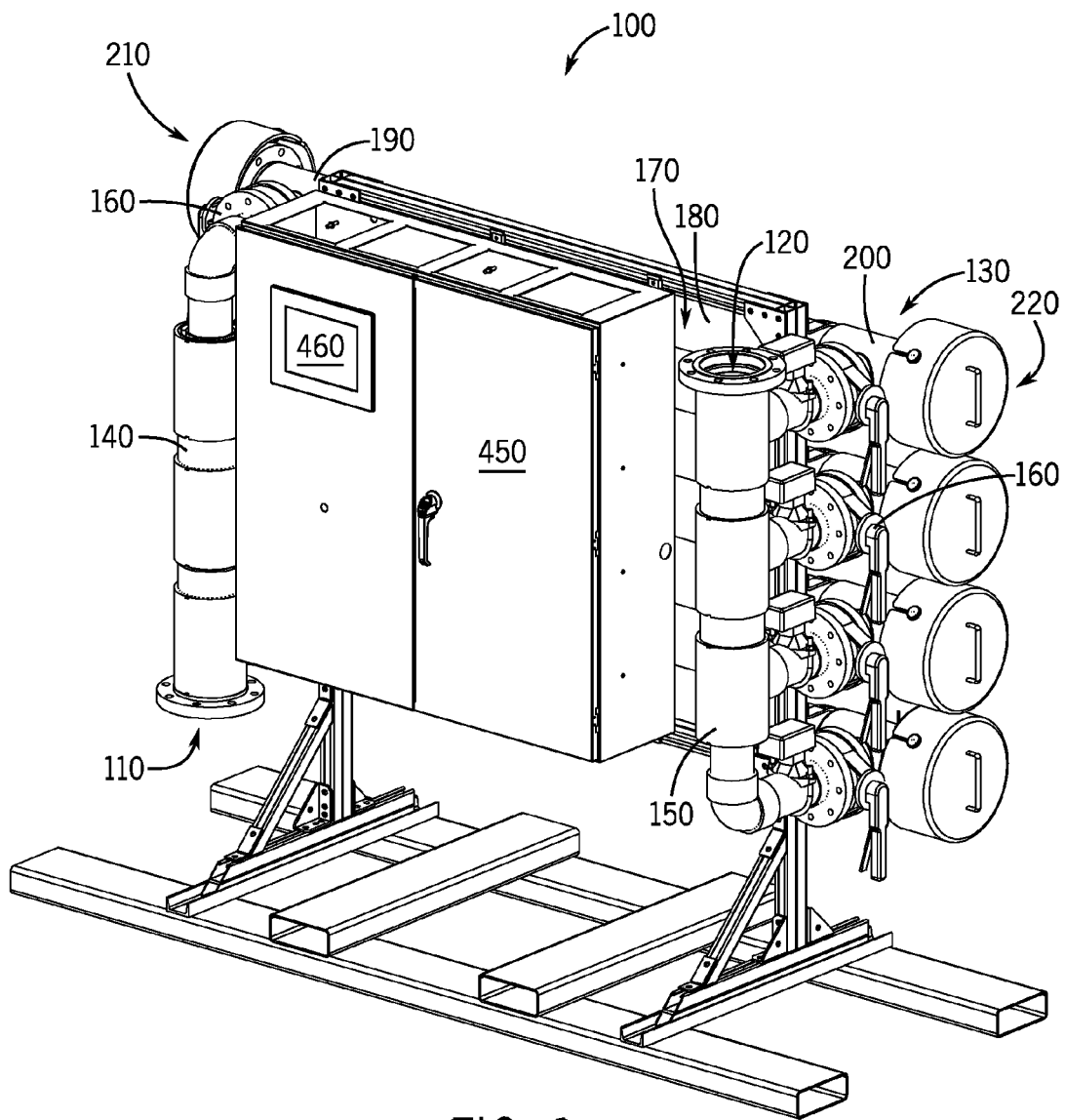
FIG. 1 is an isometric view of a PECO system, according to various embodiments.

While the disclosure is susceptible to various modifications and alternative forms, specific embodiments thereof have been shown by way of example in the drawings and are herein described below in detail. For example, any numbers, measurements, and/or dimensions illustrated in the Figures are for purposes of example only. Any number, measurement or dimension suitable for the purposes provided herein may be acceptable. It should be understood that the description of specific embodiments is not intended to limit the disclosure from covering all modifications, equivalents and alternatives falling within the spirit and scope of the disclosure.

DETAILED DESCRIPTION

Unless defined otherwise, all technical and scientific terms used herein have the same meaning as commonly understood by one of ordinary skill in the art to which the disclosure belongs. Although any methods and materials similar to or equivalent to those described herein may be used in the practice or testing of the present disclosure, example methods and materials are described below.

Figure 2:
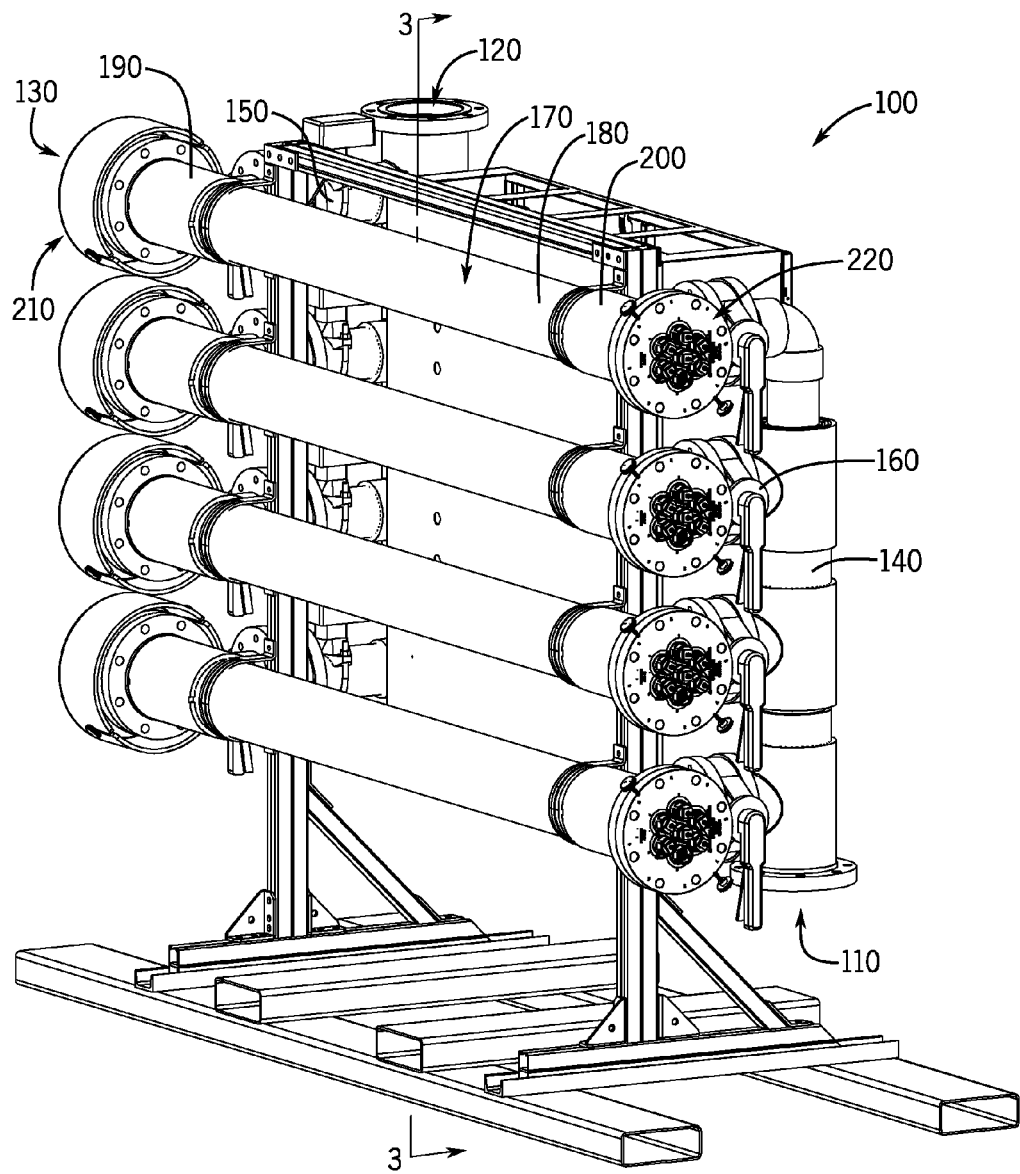
FIG. 2 is an isometric view of a PECO system, according to various embodiments.

Various embodiments of system, apparatus, and device (e.g., a photoelectrocatalytic oxidation (PECO) system, apparatus, and device) are described. Referring to FIGS. 1 and 2, a photoelectrocatalytic oxidation (PECO) system 100 is shown. In various embodiments, PECO system 100 includes at least one input 110 and at least one output 120 and at least one PECO apparatus 130. In various embodiments, the input and/or output are threaded to facilitate engagement or connection (e.g., fluid connection) of input and/or output with a hose or other fluid-conveying member. In various embodiments, input 110 is fluidly connected to an input manifold 140 that branches into multiple input manifold openings fluidly connected to one or more PECO apparatus 130 of PECO system 100. In various embodiments, output 120 is fluidly connected to an output manifold 150 that branches into one or more output manifold openings fluidly connected to one or more PECO apparatus 130 of PECO system 100. While input 110 is shown in the Figures as beginning or extending lower in elevation than or below each PECO apparatus 130 of system 100, the input may be elevated above one or more of the PECO apparatus of the PECO system. While output 120 is illustrated in the Figures as beginning or extending higher in elevation than or above each PECO apparatus 130 of system 100, the output may be lower in elevation than or below one or more of the PECO apparatus of the PECO system. In various embodiments, the output may also be coupled or fluidly connected to an output fitting (such as a u-shaped fitting) (not shown) to make it easier to couple (e.g., fluidly couple) a hose or further fittings to the output. The output fitting may also include a vent.

In various embodiments, PECO apparatus 130 is elevated at one end (e.g., at the end closest to the output) relative to the other. This may encourage collection of gases at the one end and may also help solution to completely, substantially, or optimally fill PECO apparatus 130 during use. Input 110 may be provided relatively lower in elevation or below PECO apparatus 130 and output 120 may be provided relatively higher in elevation or above PECO apparatus 130 to also help completely, substantially, or optimally fill PECO apparatus 130 during use.

Input manifold 140 and output manifold 150 each helps to allow multiple PECO apparatus 130 of PECO system 100 to be configured and/or utilized in parallel. It should be appreciated, however, that the PECO apparatus of the PECO system may also be utilized in series, or alone, in various applications and embodiments. For example, in various embodiments, one or more of the input manifold branches and one or more of the output manifold branches may be coupled to a valve 160 to help regulate and/or control flow through PECO apparatus 130 or PECO system 100 generally.

Multiple PECO systems 100 may be operatively and/or fluidly connected together (e.g., in series). For example, the output of a first PECO system may be fluidly connected to the input of a second PECO system to operatively and fluidly connect the systems in series. In various other embodiments, multiple PECO systems may be operatively or fluidly connected in parallel.

As shown in FIGS. 1 and 2, in various embodiments, each PECO system 100 includes multiple PECO apparatus 130. While four PECO apparatus 130 are shown in FIGS. 1 and 2, it should be appreciated that any number of the PECO apparatus may be utilized in connection with the PECO system disclosed herein. Also, while multiple PECO apparatus 130 are shown in a stacked (e.g., vertically-stacked) arrangement, any variety of arrangements and configurations may be utilized within the scope of this disclosure. For example, multiple PECO apparatus may be provided in a row (e.g., side-to-side), in two rows of two, etc.

In various embodiments, PECO system 100 and/or PECO apparatus 130 includes and/or is a substantially self-contained system and/or apparatus (apart from the input or in-flow and output or out-flow apertures, gas vents, etc.). Each PECO apparatus 130 in various embodiments includes a housing, chamber, or container 170 which is adapted to at least partially receive components (e.g., one or more operative components) of PECO apparatus 130 and/or at least temporarily receive, contain and/or circulate fluid or aqueous solution.

In various embodiments, housing 170 includes at least one generally annular, tubular (e.g., a square or rectangular tube), cylindrical or conical housing member 180 extending between a first opposing end 190 and a second opposing end 200. Housing member 180 of each PECO apparatus 130 may be formed of any suitable materials, or combination of materials, and be of any size or shape suitable for its intended purposes. In one or more examples of embodiments, housing member 180 is a molded, high-durability plastic or polyethylene (e.g., PVC) and/or may be formed to be resistant to one or more contaminants. Housing member 180 may also take alternative shapes, sizes, and configurations. One or more components of housing 170 and/or housing member may also be constructed of metal which may be lined (e.g., with an inert polymer compound such as Teflon or PPS material).

In various embodiments, housing 170 includes a first fitting 190 provided about first opposing end 210 and a second fitting 200 provided about second opposing end 220 of housing member 180. Fittings 190/200 may be formed of any suitable materials, or combination of materials, and be of any size or shape suitable for their intended purposes. In one or more examples of embodiments, fittings 190/200 are made of a high-durability plastic or polyethylene (e.g., PVC) and/or may be formed to be resistant to one or more contaminants. In one or more other examples of embodiments, the fittings are made of metal. Alternative materials and shapes suitable for the purposes of the system and/or apparatus are also acceptable.

In various embodiments, fittings 190/200 are T-fittings defining one or more in-flow apertures and/or out-flow apertures. In various embodiments, the in-flow and out-flow apertures defined by fittings 190/200 are fluidly connected to input 110 and/or input manifold 130, and/or output 120 and/or output manifold 140. The locations of the in-flow and out-flow apertures may vary depending upon the desired results (e.g., the flow of solution through the apparatus, the timing and/or length of time thereof, other system configurations, etc.). For example, the in-flow and out-flow apertures may be provided through the housing member or ends of the PECO apparatus. In addition, the orientation of the in-flow and out-flow apertures (e.g., relative to each other) may be different than or modified from that shown in the Figures.

In various embodiments, one or both fittings 190/200 define a fitting cavity or other feature shaped to fit snugly or tightly to or otherwise receive or be received by one or both opposing ends 210/220. However, one or both of the fittings may be coupled with or to the opposing ends and/or the housing member in other ways (e.g., through a threaded connection or by butting the respective fitting to or near the first and second opposing ends). In various embodiments, a seal (e.g., an O-ring) is provided between one or both of fittings 190/200 and opposing ends 210/220.

Figure 3:
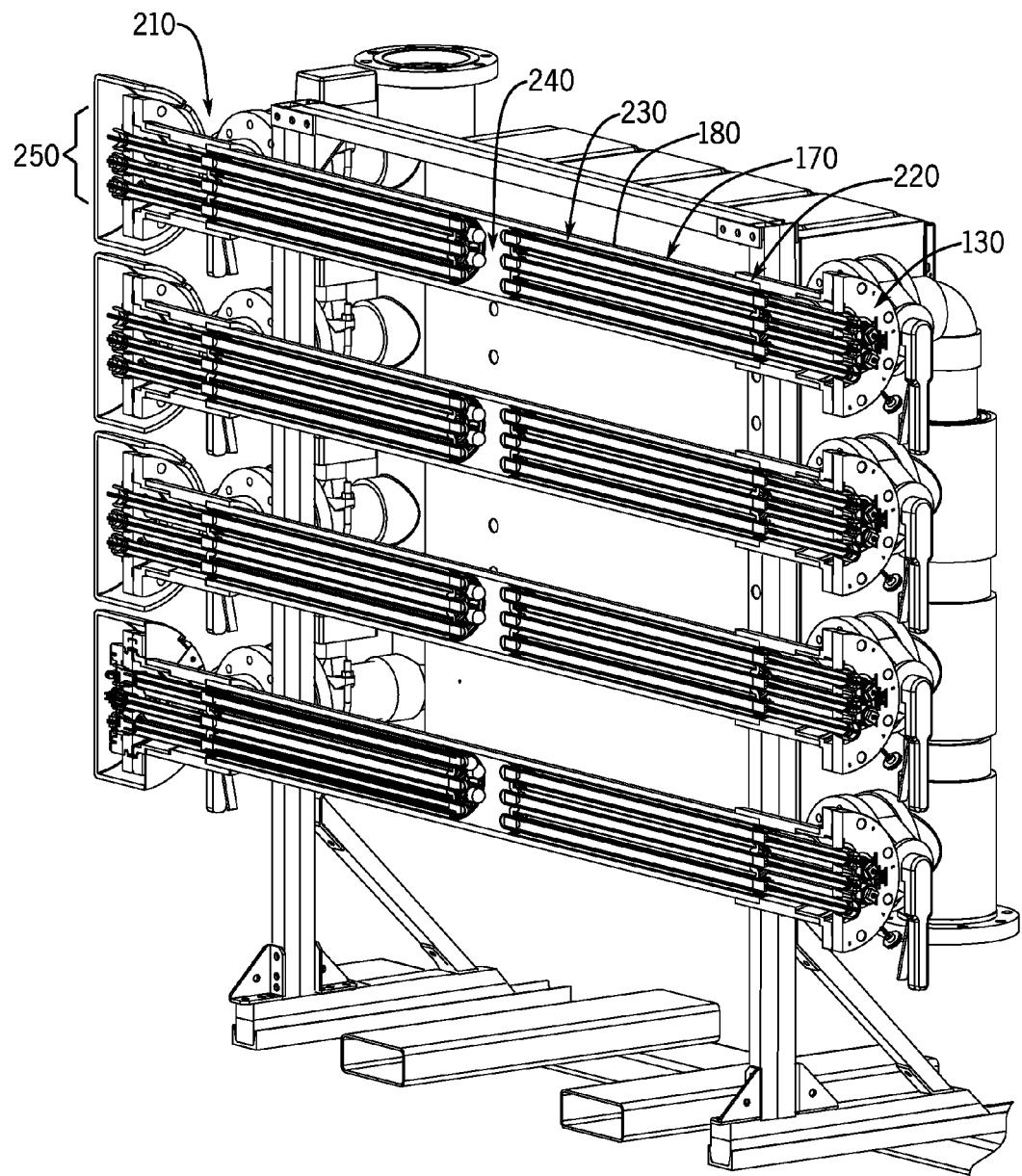
FIG. 3 is an isometric cross-sectional view of the PECO system shown in FIG. 2, according to various embodiments.
Figure 4:
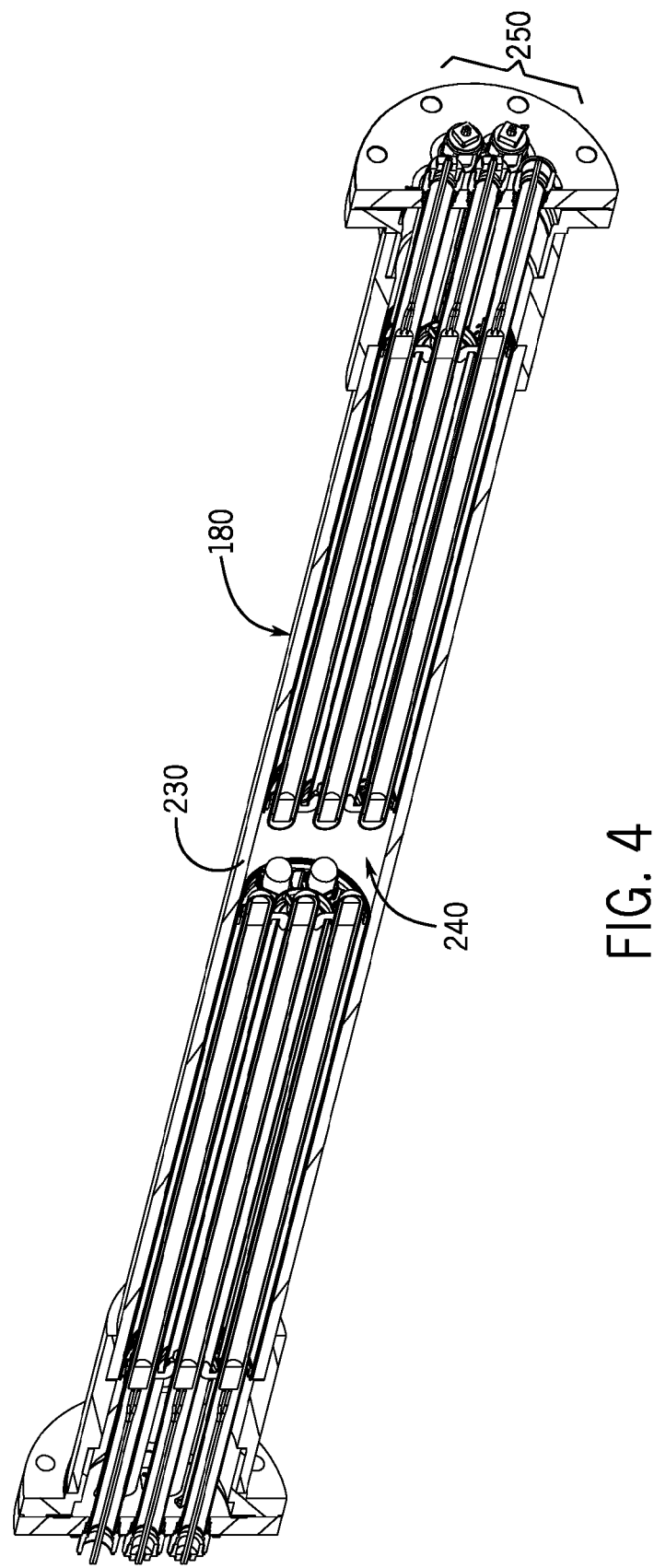
FIG. 4 is an isometric cross-sectional view of a PECO apparatus, according to various embodiments.

Referring now to FIGS. 3-4, in various embodiments, one or more housing walls or sidewalls 230 of housing member 180 help define at least one housing cavity 240. In various embodiments, housing cavity 240 is substantially or entirely annular, tubular, cylindrical, or conical in shape (e.g., cross-sectional shape). In various embodiments, apart from the in-flow apertures and out-flow apertures, any drainage apertures and gas vents, housing cavity 240 is sealed or substantially sealed (e.g., from an outside environment and/or an environment exterior to housing 170) to prevent various elements (e.g., air or oxygen) from entering housing cavity 240 and/or various elements (e.g., a solution) from exiting or escaping housing cavity 240, except through the in-flow and/or out-flow or drainage apertures, or vents (e.g., one-way vents). For example, in various embodiments, the PECO system or PECO apparatus includes an area for collecting or allowing gases to gather or accumulate and/or a valve or other component for bleeding off or removing one or more gases (e.g., hydrogen (H2) or otherwise allowing them to escape from inside the PECO apparatus or system. In various embodiments, gases collect (e.g., at a high point of the system or an apparatus) and a float style valve allows the release of such gases while preventing fluid in the apparatus or system from escaping. The exit port on such a valve may be directed as necessary or desired (e.g., to the outside, for collection, etc.). In various embodiments, the PECO apparatus may include a drainage apparatus or feature (e.g., to help drain solution before servicing).

In various embodiments, housing cavity 240 is adapted to receive various components of PECO apparatus 130. In various embodiments, at least one reactor assembly 250 is at least partially provided in or received by housing cavity 240. In various embodiments, multiple (e.g., two) reactor assemblies 250 are provided in housing cavity 240. For example, and as shown in FIGS. 3-4, a reactor assembly 250 may be provided in first and second opposing ends 210/220. In various embodiments, each reactor assembly 250 extends from about opposing ends 210/220 into housing cavity 240 of PECO apparatus 130. While each reactor assembly 250 is shown in the Figures as extending nearly halfway into a length of housing cavity 240, it should be appreciated that the reactor assembly may extend into any length (including substantially the entire length) of the housing cavity.

Figure 5:
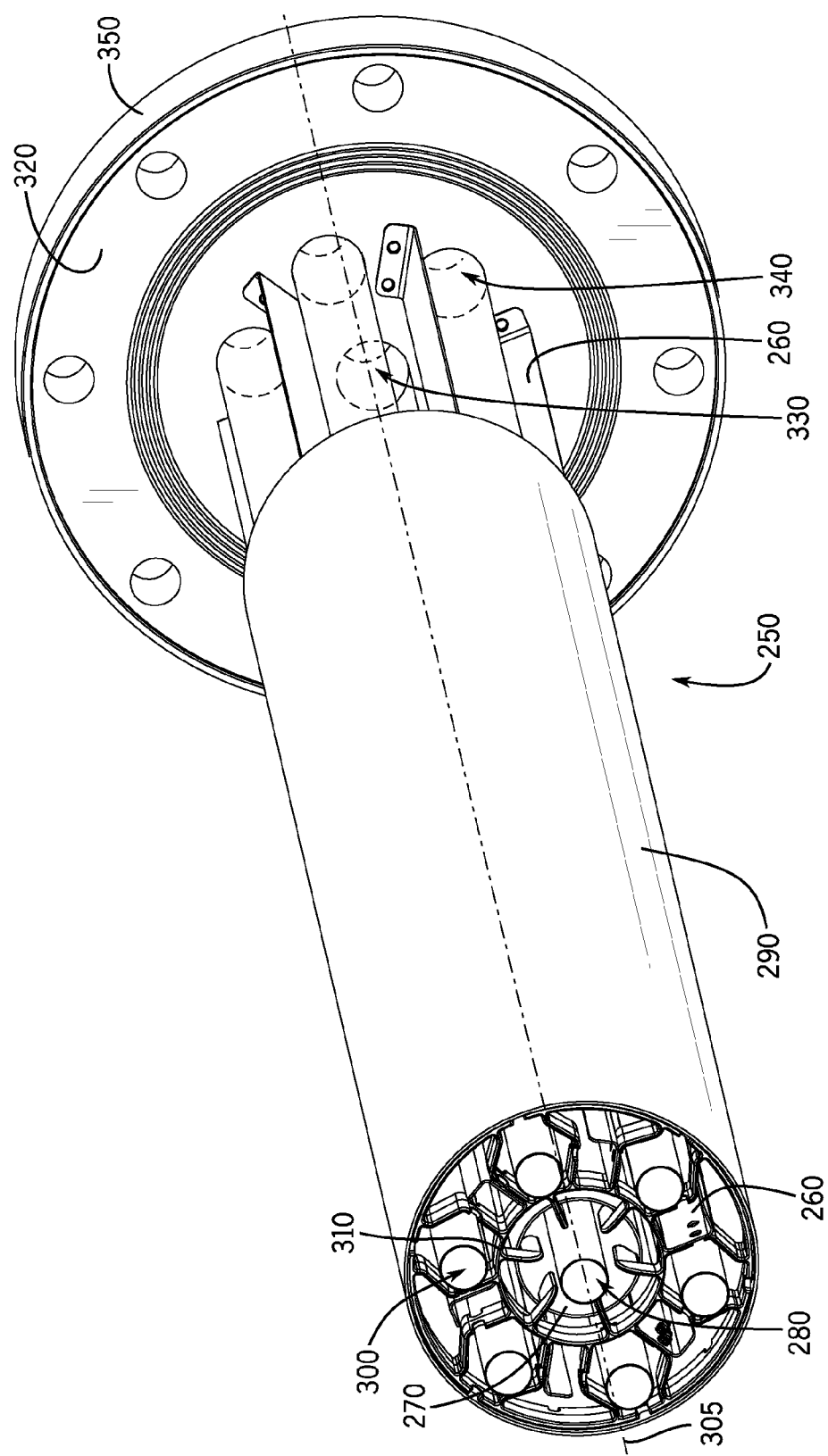
FIG. 5 is an isometric view of a reactor assembly, according to various embodiments.
Figure 6:
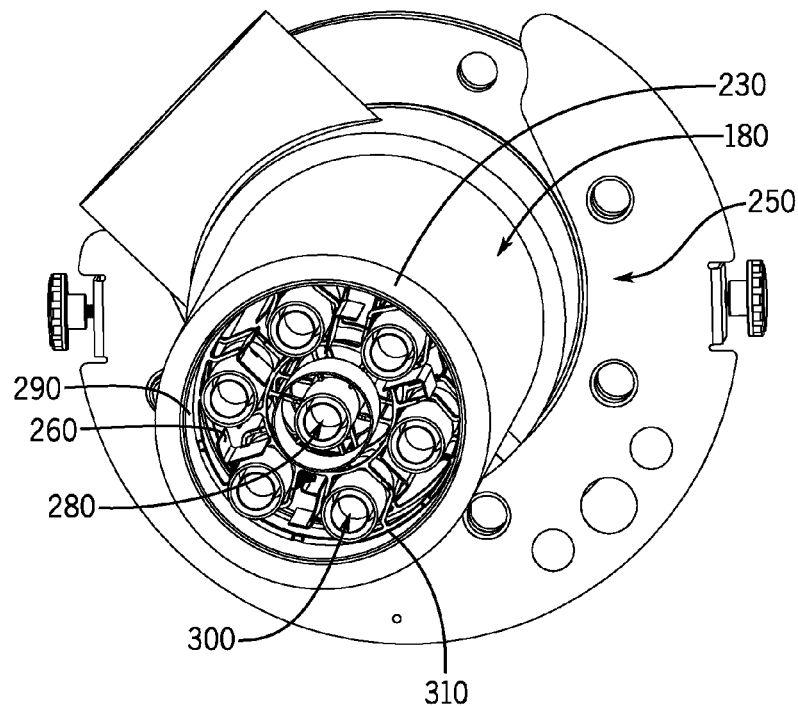
FIG. 6 is an isometric cross-sectional view of a PECO apparatus, according to various embodiments.
Figure 7:
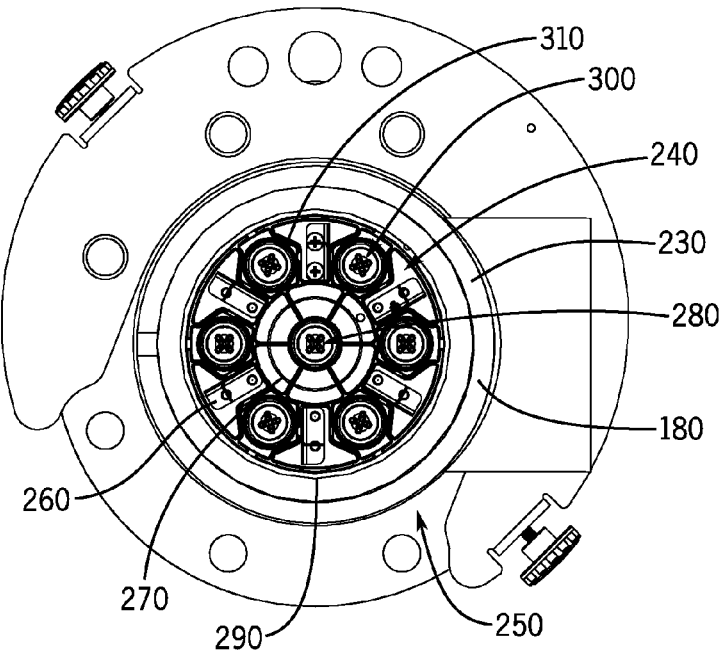
FIG. 7 is a cross-sectional view of a PECO apparatus, according to various embodiments.

Referring now to FIGS. 5-7, in various embodiments, reactor assembly 250 includes at least one counterelectrode (e.g., cathode) 260, at least a first photoelectrode (e.g., anode) 270, and at least a first light source (e.g., UV-light source) or first light source assembly 280. In various embodiments, reactor assembly 250 includes a second photoelectrode 290, and one or more second light sources or second light source assemblies 300. In various embodiments, first photoelectrode 270 is provided around first light source assembly 280.

In various embodiments, reactor assembly 250 includes first light source assembly 280 (e.g., a centralized UV light source) with one or more second light source assemblies 300 (e.g., six additional UV light sources) provided (e.g., in a spaced relationship) around first light source assembly 280. In various embodiments, first light source assembly 280 is provided about a longitudinal axis 305 of reactor assembly 250. In various embodiments, one or more second light source assemblies 300 are spaced around longitudinal axis 305. In various embodiments, one or more second light source assemblies 300 are generally spaced symmetrically around longitudinal axis 305. In various embodiments, one or more counterelectrodes 260 or cathodes are provided (e.g., in a spaced relationship) around first light source assembly 280 (e.g., in one or more of the spaces between the second light source assemblies 300). In various embodiments, one or more counterelectrodes or cathodes 260 (e.g., counterelectrode or cathode strips) are provided offset from their mounting hole centerlines. Among other things, this may allow additional counterelectrodes (e.g., an additional counterelectrode for each offset mounting hole) to be added to the reactor assembly as necessary or desired to help balance or otherwise better optimize reactions (e.g., with first and/or second photoelectrodes 270/290.

In various embodiments, reactor assembly 250 includes second photoelectrode 290 provided between first photoelectrode 270 and housing wall 230. In various embodiments, reactor assembly 250 includes a second light source assembly 300 provided between first photoelectrode 270 and second photoelectrode 290. In various embodiments, reactor assembly 250 includes multiple second light source assemblies 300 (e.g., spaced second light source assemblies) provided between first light source assembly 280 and second photoelectrode 290 and/or housing wall 230. In various embodiments, one or more second light source assemblies 300 are spaced in a radial array between first photoelectrode 270 and second photoelectrode 290.

One or more of the counterelectrodes may be provided in a variety of positions in the reactor assembly, and/or the PECO apparatus. For example, in various embodiments, at least one counterelectrode 260 is provided between multiple first and/or second light source assemblies 280/300. As another example, at least one counterelectrode 260 may be provided in a space between housing wall 230 and the one or more light source assemblies. In one or more examples of embodiments, one or more counterelectrodes 260 are provided in a spaced relationship radially around first photoelectrode 270. In various embodiments, one or more counterelectrodes 260 are provided between first photoelectrode 270 and second photoelectrode 290. In various embodiments, the one or more counterelectrodes 260 are arranged between the first photoelectrode 270 and second photoelectrode 290 and second light source assemblies 300 (e.g., on a line or ring concentric to the longitudinal axis of first light source assembly and/or housing member 180).

It should be appreciated that, while seven light source assemblies 280/300 are shown in the FIGS. 5-7, any number of light source assemblies may be utilized and/or included in the reactor assembly. It should also be appreciated that, while six counterelectrodes 260 are shown in the FIGS. 5-7, any number of the counterelectrodes may be utilized and/or included within or as part of the reactor assembly.

In various embodiments, reactor apparatus 250 includes first light source assembly 280 centrally located within a space from housing wall or walls 230 and one or more second light source assemblies 300 between first light source assembly 280 and housing wall or walls 230. For example, reactor assembly 250 may include first light source assembly 280 at or near the longitudinal axis of housing cavity 240 at least partially surrounded, encircled, and/or ringed by multiple (e.g., six) second light source assemblies 300, each of which is provided within housing cavity 240.

It should be noted, however, that the light source assemblies may be provided with the housing cavity in any variety of ways and locations, and it is not necessary that the light source assemblies be provided concentrically within and/or centrally spaced from the wall or walls forming or defining the housing cavity. Rather, the light source assemblies may be provided in any variety of positions and/or configurations without departing from the spirit and scope of this disclosure. In various embodiments, the reactor assembly also includes a means for cleaning or unfouling the light sleeve or tube of the one or more light source assemblies.

In various embodiments, one or more first and second photoelectrodes 270/290 are provided within housing cavity 240. In various embodiments, first photoelectrode 270 is provided at least substantially around first light source assembly located on or about the longitudinal or central axis of the housing cavity 240. In various embodiments, second photoelectrode 290 may be wrapped, wound, or otherwise provided at least substantially around first photoelectrode 270 and one or more light source assemblies 280/300, and/or housing wall 230. In various embodiments, first photoelectrode 270 is provided between a centrally located first light source assembly and one or more second light source assemblies 300. In various embodiments, second photoelectrode 290 is provided between all light source assemblies of the reactor assembly and the housing wall 230.

In various embodiments, first photoelectrode 270 (e.g., anode) may be wrapped, wound, or otherwise provided around and/or between first light source assembly 280 concentric within and/or spaced apart from the housing wall 230 and one or more second photoelectrodes 290. In various embodiments, second photoelectrode 290 may be wrapped, wound, or otherwise provided around and/or between first photoelectrode 270 and housing wall 230. In examples of embodiments, one or more second light source assemblies 300 are provided between first photoelectrode 270 and second photoelectrode 290.

In one or more examples of embodiments, first photoelectrode 270 and second photoelectrode 290 (e.g., a foil photoelectrode) are wrapped, wound, or otherwise provided within housing cavity 240 such that a majority or substantial portion of UV light or radiation (e.g., from the first and second light source assemblies) with housing cavity 240 is directed at or otherwise exposed to first and second photoelectrodes 270/290.

It should be appreciated that any number of photoelectrodes and light source assembly configurations may be utilized within a scope of this disclosure. In various embodiments, the photoelectrodes are provided (e.g., around the light source assemblies) to optimize the distance, separation or spacing between the photoelectrodes and the light source assemblies. In various embodiments, one or more photoelectrodes may be wrapped, wound, or otherwise provided around the surface of a light tube or sleeve of each light source assembly, multiple light tubes or sleeves, or one light tube or sleeve. The photoelectrodes may be provided closely or tightly around or against each light source assembly. In various embodiments, a photoelectrode may be coupled (e.g., removably coupled) to a light source assembly.

In various embodiments, and as shown in FIGS. 5-7, reactor assembly 250 also includes one or more spacer members 310. One or more spacer members 310 may be utilized, for example, to keep reactor assembly components such as the first and/or second photoelectrodes 270/290, counterelectrodes 260, and first and/or second light source assemblies 280/300 in a desired spatial relationship relative to each other, other components, and/or housing wall 230. In various embodiments, portions of spacer member 310 are adapted to receive first and second light source assemblies 280/300. In various embodiments, spacer member 310 is adapted to help maintain separation or spacing between at least a portion of first and second photoelectrodes 270/290 and one or more counterelectrodes 260 (e.g., to prevent shorting or arcing near an edge or end of reactor assembly 250.

Figure 8:
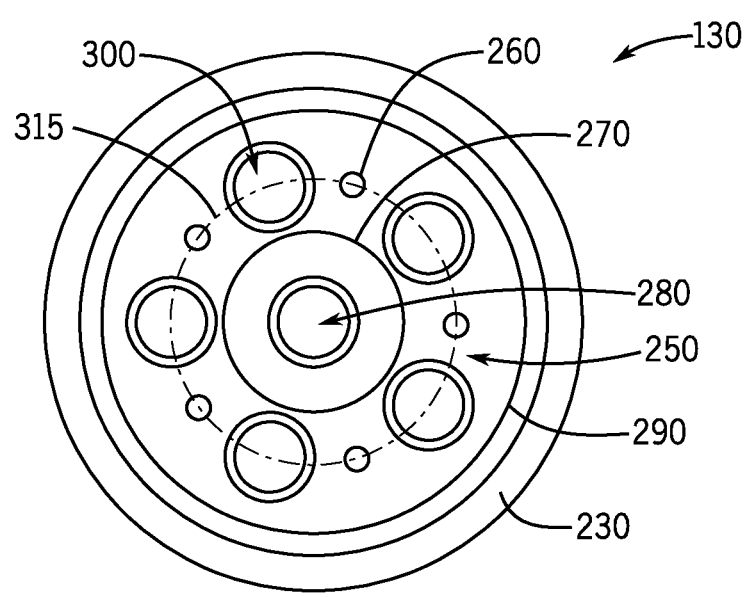
FIG. 8 is a cross-sectional view of a PECO apparatus, according to various embodiments.
Figure 9:
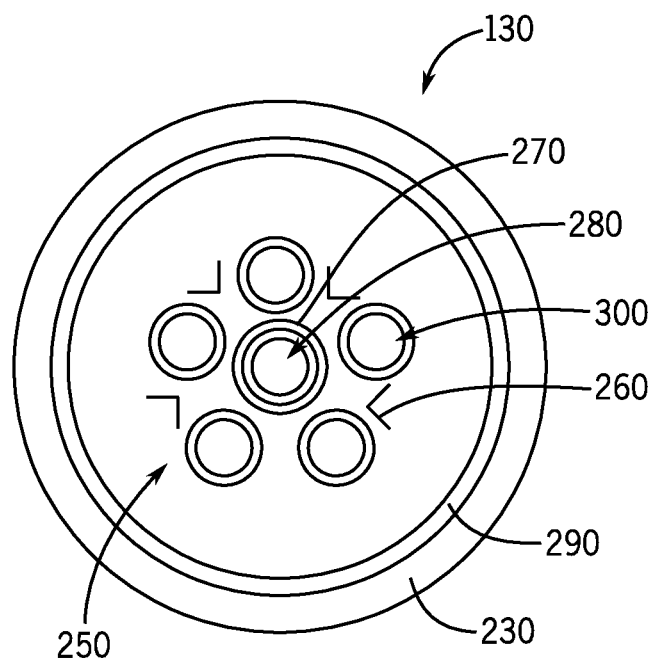
FIG. 9 is a cross-sectional view of a PECO apparatus, according to various embodiments.
Figure 10:
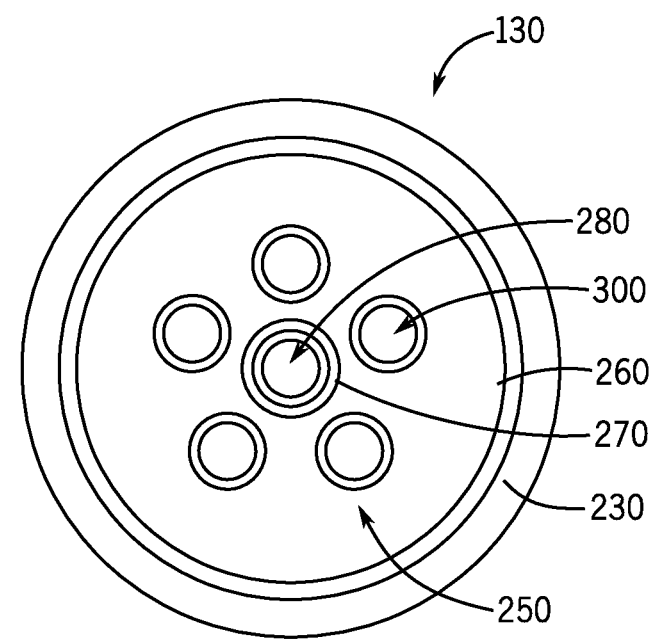
FIG. 10 is a cross-sectional view of a PECO apparatus, according to various embodiments.
Figure 11:
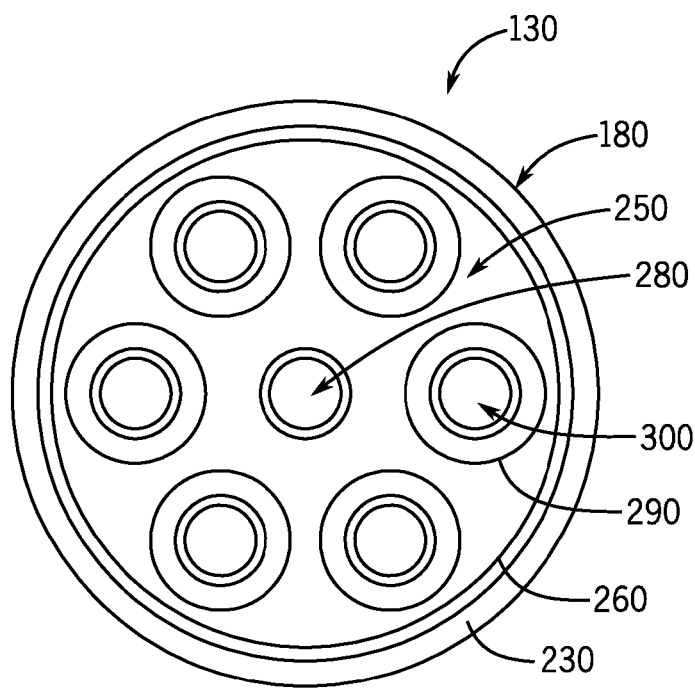
FIG. 11 is a cross-sectional view of a PECO apparatus, according to various embodiments.
Figure 12:
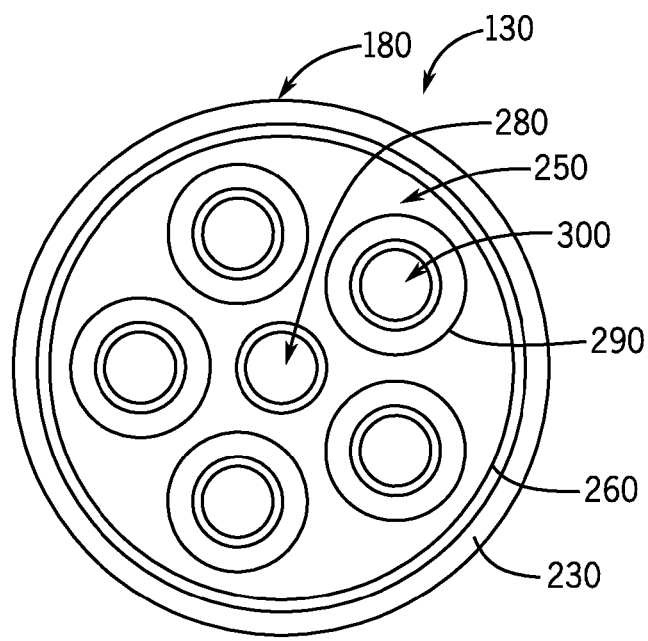
FIG. 12 is a cross-sectional view of a PECO apparatus, according to various embodiments.
Figure 13:
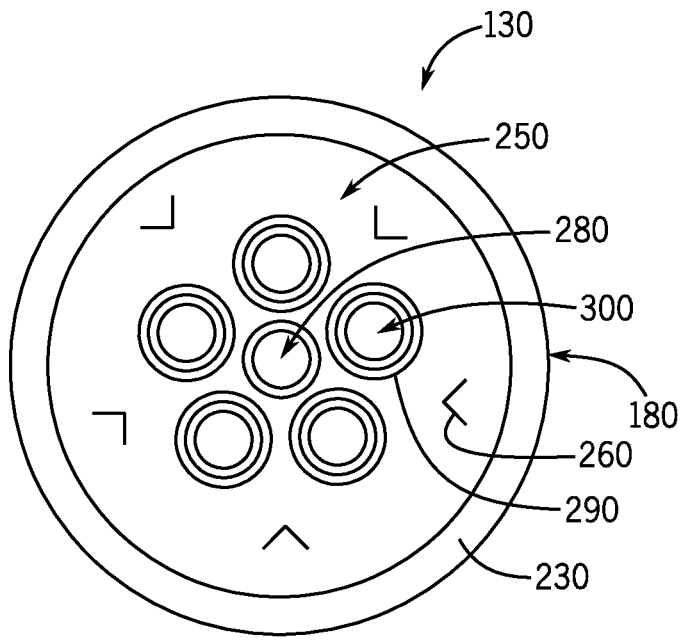
FIG. 13 is a cross-sectional view of a PECO apparatus, according to various embodiments.
Figure 14:
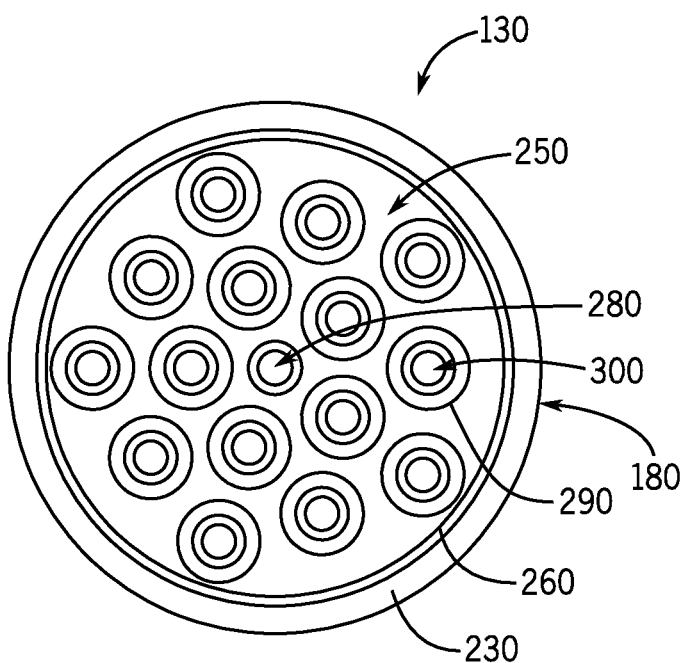
FIG. 14 is a cross-sectional view of a PECO apparatus, according to various embodiments.

Referring now to FIGS. 8-9, in various embodiments, reactor assembly 250 includes one or more second light source assemblies 300 (e.g., six second light source assemblies) arranged around first light source assembly 280 on a line or ring 315 concentric to a longitudinal axis of reactor apparatus 250 and/or first light source assembly 280. In various embodiments, reactor assembly 250 or PECO apparatus 130 may include more or less than six of the second light source assemblies and/or more or less than six of the counterelectrodes. In various embodiments, reactor assembly 250 of PECO apparatus 130 includes less than six (e.g., five) second light source assemblies 300 provided between first light source assembly 280 (and/or first photoelectrode 270), and second photoelectrode 290 (and/or housing wall 230). In various embodiments, reactor assembly 250 of PECO apparatus 130 includes less than six (e.g., five) counterelectrodes spatially arranged or otherwise provided between five second light source assemblies 300 and arranged or provided between first light source assembly 280 (and/or first photoelectrode 270), and second photoelectrode (and/or wall 230). In various embodiments, PECO apparatus 130 includes one or more counterelectrodes 260 spatially arranged between multiple second light source assemblies 300 and provided between first light source assembly 280 (and/or first photoelectrode 270), and second photoelectrode (and/or wall 230). Referring now to FIG. 10, in various embodiments, PECO apparatus 130 includes multiple second light source assemblies 300 provided between first light source assembly 280 (and/or first photoelectrode 270), and at least one counterelectrode 260 (and/or wall 230).

Referring now to FIGS. 11-14, reactor assembly 250 or PECO apparatus 130 may include one or more second photoelectrodes 290 provided around one or more second light source assemblies 300 and one or more counterelectrodes 260 provided around second photoelectrodes 290. For example, PECO apparatus 130 in various embodiments includes multiple second light source assemblies 300 provided around first light source assembly 280 (and/or the longitudinal axis of housing member 180 of PECO apparatus 130), one or more second photoelectrodes 290 provided around one or more second light source assemblies 300 and at least one counterelectrode 260 provided around second photoelectrodes 290 and/or between second photoelectrodes 290 and wall 230. In various embodiments, the reactor assembly may not include the first light source assembly.

While the figures show a variety of light source assembly configurations including a seven light source assembly configuration, a six light source assembly configuration, and a sixteen light tube or sleeve configuration, it should be appreciated that any number of light tubes or sleeves in any variety of configurations may be utilized or otherwise provided.

Referring again to FIG. 5, in various embodiments, reactor assembly 250 includes a bulkhead member 320. In various embodiments, bulkhead member 320 defines a first light source aperture 330 and one or more second light source aperture 340 between the first light source aperture and a perimeter 350 of bulkhead member 320. For example, as shown in FIG. 5, bulkhead member 320 may define a central first light source aperture 330 and multiple similarly-sized second light source apertures 340 whose centers are arranged around first light source aperture 330 on a line concentric to a center of central light source aperture 330 and/or a center of bulkhead member 320. First and second light source aperture 330/340 is, in various embodiments, adapted to retain and/or releasably retain a first and/or second light source assembly 280/300. In various embodiments, first and second light source apertures 330/340 are adapted to receive a light source assembly such as an assembly shown in FIGS. 18-19. In various embodiments, such assemblies include one or more light tubes or sleeves. In various embodiments, the bulkhead member may also define a recess into which a printed circuit board may be mounted for controlling the operation of the device or apparatus.

In various embodiments, one or more counterelectrode and/or photoelectrode apertures are defined by bulkhead member 320. In various embodiments, the one or more counterelectrode and photoelectrode apertures defined by bulkhead member 320 are provided between and/or near two or more light source apertures 330/340 to allow a bias or potential to be applied to photoelectrodes 270/290 and counterelectrodes 260 of reactor assembly 250. It should be appreciated that, while seven light source apertures 330/340 are shown, any number of the light source apertures may be defined by the bulkhead member. It should also be appreciated that, while six counterelectrode apertures and two photoelectrode apertures are defined by bulkhead member 320 are shown in the Figures, any number of the photoelectrode apertures and the counterelectrode apertures may be defined by the bulkhead member.

In various embodiments, terminals, terminal configurations and/or leads are electrically coupled to the photoelectrodes. The leads are adapted to receive an applied voltage bias, potential and/or current provided by a power source connected or otherwise coupled (e.g., electrically connected coupled) to the leads. The leads are formed of a conductive material, such as a conductive metal. One or more of the leads may define or be provided with an aperture for ease of connection or coupling of the lead to a wire, electrical cable or the like.

While not shown, the photoelectrode(s) and counterelectrode(s) may be separated by a separator. Each separator may be used or otherwise provided to prevent shorting. In one or more examples of embodiments, each photoelectrode (e.g., anode) and counterelectrode (e.g., cathode) are separated by plastic or plastic mesh separator, although alternative separators (e.g., other dielectric material(s) or other separators accomplishing or tending to accomplish the same or similar purposes) may be acceptable for use with the device and system described herein.

In various embodiments, first and second photoelectrodes 270/290 include a conductive support member and a film member. In one or more examples of embodiments, the conductive support member is constructed from metal (e.g., titanium or Ti). In various embodiments, the film member is nanoporous and includes a thin layer (e.g., 200-500 nm) of titanium dioxide ($TiO_2$) (e.g., a $TiO_2$ coating) that is provided and/or adapted to function as a photocatalyst. In various examples of embodiments, the film member has an average thickness in the range of 1-2000 nanometers. In one or more examples of embodiments, the film member has an average thickness in the range of 5 to 500 nanometers.

In various embodiments, the film member is provided on (e.g., coated on or adhered to) the conductive support member. In various embodiments, the film member has a median pore diameter in the range of 0.1-500 nanometers and is constructed from $TiO_2$ nanoparticles. In one or more examples of embodiments, the median pore diameter of the film member is in the range of 0.3-25 nanometers. In other examples of embodiments, the median pore diameter of the film member is in the range of 0.3-10 nanometers.

In various examples of embodiments, the film member is constructed from a stable, dispersed suspension comprising $TiO_2$ nanoparticles having a median primary particle diameter in the range of 1-50 nanometers. The nanoporous film may also be deposited by other methods, such as plasma, chemical vapor deposition or electrochemical oxidation. In one or more examples of embodiments, the $TiO_2$ nanoparticles have a median primary particle diameter in the range of 0.3-5 nanometers.

In various embodiments, the film member is constructed from a stable, dispersed suspension including a doping agent. Examples of suitable doping agents include, but are not limited to, Pt, Ni, Au, V, Sc, Y, Nb, Ta, Fe, Mn, W, Co, Ru, Rh, P, N and/or carbon (including carbon nanotubes, fullerenes, graphene, etc.).

In various examples of embodiments, the nanoporous film member is constructed by applying a stable, dispersed suspension having $TiO_2$ nanoparticles suspended therein. In various embodiments, the $TiO_2$ nanoparticles are sintered at a temperature in the range of 300 deg C. to 1000 deg C. for 0.5 to 24 hours. Example photoelectrodes may be prepared by coating Ti metal foil. Titanium foil is stable and may also be used to make the first and second photoelectrodes. One example of suitable Ti metal foil includes 15 cm×15 cm×0.050 mm thickness and 99.6+% (by weight) pure Ti metal foil commercially available from Goodfellow Corp. (Oakdale, Pa.) with a titania-based metal oxide. In various embodiments, the Ti metal foil is cleaned with a detergent solution, rinsed with deionized water, rinsed with acetone, and/or heat-treated at 350 deg C. for 4 hours providing an annealed Ti foil Annealing may also be conducted at higher temperatures such as 500 deg C.

Following cleaning and/or pretreatment, in various embodiments, the metal foil may be dip-coated. For example, the metal foil may be dip-coated three to five times with an aqueous suspension of titania at a withdrawal rate of ~3.0 mm/sec. After each application of coating, in various embodiments, the coated foil is air dried for about 10-15 min and then heated in an oven at 70 deg C. to 100 deg C. for about 45 min. After applying a final coating, in various embodiments, the coated foil is sintered at 300-600 deg C. (e.g., 300 deg C., 400 deg C. or 500 deg C.) for 4 hours at a 3 deg C./min ramp rate. The Ti foil may be dipped into suspensions of titania synthesized using methods disclosed in U.S. patent application Ser. Nos. 11/932,741 and 11/932,519, each of which is incorporated herein by reference in its entirety. In various embodiments, the optimized withdrawal speed is around 21.5 cm min$^{-1}$.

In addition, in one or more examples of embodiments, the stable, dispersed suspension is made by reacting titanium isopropoxide and nitric acid in the presence of ultrapure water or water purified by reverse osmosis, ion exchange, and one or more carbon columns. In various embodiments, the conductive support member is annealed titanium foil. Other conductive supports may be employed, such as conductive carbon or glass. In various other embodiments, the first and second photoelectrode may be constructed from an anatase polymorph of Ti or a rutile polymorph of Ti. In one or more examples of embodiments, the rutile polymorph of Ti is constructed by heating an anatase polymorph of Ti at a temperature in the range of 300 deg C. to 1000 deg C. for a sufficient time. In one or more examples of embodiments, the anatase polymorph of Ti is heated at 500 deg C. to 600 deg C. to produce the rutile polymorph of Ti.

In various embodiments, after the titanium support is provided with a layer or film of $TiO_2$, the composite electrode is air-heated at a high temperature, giving the nanoporous $TiO_2$ film a crystalline structure due to thermal oxidation. It is believed that the instant titania, when heated at 500 deg C., converts to a crystalline rutile polymorph structure. It is further believed that the instant $TiO_2$ heated at 300 deg C. converts to a crystalline anatase polymorph structure. In some PECO applications, rutile $TiO_2$ has substantially higher catalytic activity than the anatase $TiO_2$. Rutile $TiO_2$ may also have substantially higher catalytic activity with respect to certain contaminant such as ammonia.

The first and/or second photoelectrodes may be modified (e.g., to improve performance). In various embodiments, the photoelectrodes (e.g., Ti foil) are modified to increase the surface area of the photoelectrodes exposed to light such as UV light. For example, the photoelectrodes may be corrugated. As another example, the photoelectrodes may be wavy. The photoelectrodes may include various other features or microfeatures to help optimize the surface exposed to UV light and/or help cause turbulence in fluid or solution about the photoelectrode.

In various embodiments, photoelectrode modifications include corrugating or otherwise modifying the photoelectrodes, conductive support member or foil to produce a wave-like pattern (e.g., regular wave-like pattern) on the foil surface. In various embodiments, the height of a corrugation "wave" is from about 1-5 mm. For example, in various embodiments, corrugating the foil twice at right angles to each other produces a cross-hatched pattern on the foil surface.

In various embodiments, the photoelectrode modifications include holes or perforations made, defined by or provided in photoelectrodes, conductive support member, or foil. In various embodiments, the holes or perforations are made or provided at regular intervals (e.g., 0.5 to 3 cm spacing between the holes).

Modifications of the photoelectrodes may also include various microfeatures and/or microstructures. Accordingly to various embodiments, the modifications of the photoelectrodes, conductive support members or foils may also include various microfeatures and/or microstructures that increase the relative surface area of the photoelectrodes and/or increase or promote turbulence about the photoelectrodes. For example, according to various embodiments, such microfeatures and/or microstructures include those that are disclosed in U.S. Patent Publication Nos. 20100319183 and 20110089604, each of which is incorporated herein by reference in its entirety, or such microfeatures and/or microstructures that are provided commercially from Hoowaki, LLC (Pendleton, S.C.). In various embodiments, the microfeatures may include microholes. In various embodiments, modifications of the photoelectrodes include the formation of nanotubes (e.g., $TiO_2$ nanotubes) on the photoelectrodes, conductive support members and/or foils such as, for example, those that are disclosed in U.S. Patent Publication No. 20100269894, which is incorporated herein by reference in its entirety.

As a result of the holes, the positioning, the corrugation, and other modifications, etc., the photoelectrodes may help create turbulence in fluid flowing in and/or through the PECO apparatus. Additionally, one or more holes may allow oxidants generated or produced on or near a surface of the photoelectrodes to more rapidly and effectively make their way into or otherwise reach or react with the fluid (e.g., aqueous solution) and/or contaminants therein.

In one or more examples of embodiments, the photoelectrodes are in the form of a mesh (e.g., a woven mesh, such as a 40×40 twill weave mesh or 60×60 Dutch weave mesh, or a non-woven mesh).

In various embodiments, counterelectrode (e.g., cathode) 260 is in the form of a rod such as a rod with an L-shaped cross-section. However, the counterelectrode may be in the form of a wire, foil, plate, cylinder, or in another suitable shape or form. In various embodiments, the counterelectrode may be corrugated and/or have other features to help cause or promote turbulence in fluid or solution in the cavity.

In one or more examples of embodiments, the counterelectrode or cathode is constructed from or includes Al, Pt, Ti, Ni, Au, stainless steel, carbon and/or another conductive metal.

Figure 15:
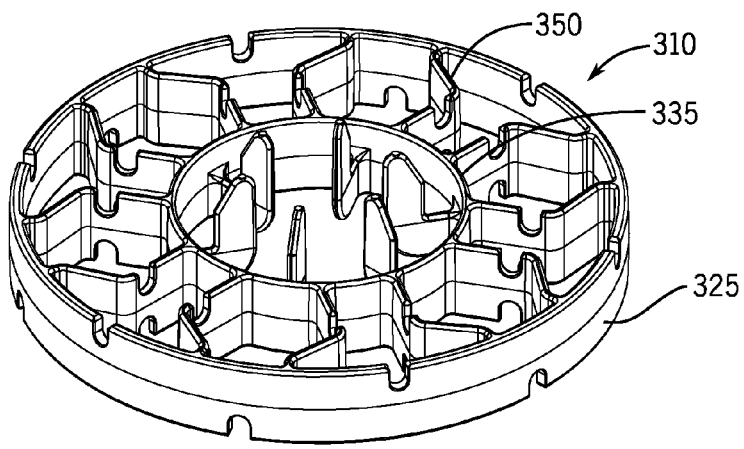
FIG. 15 is an isometric view of a spacer, according to various embodiments.
Figure 16:
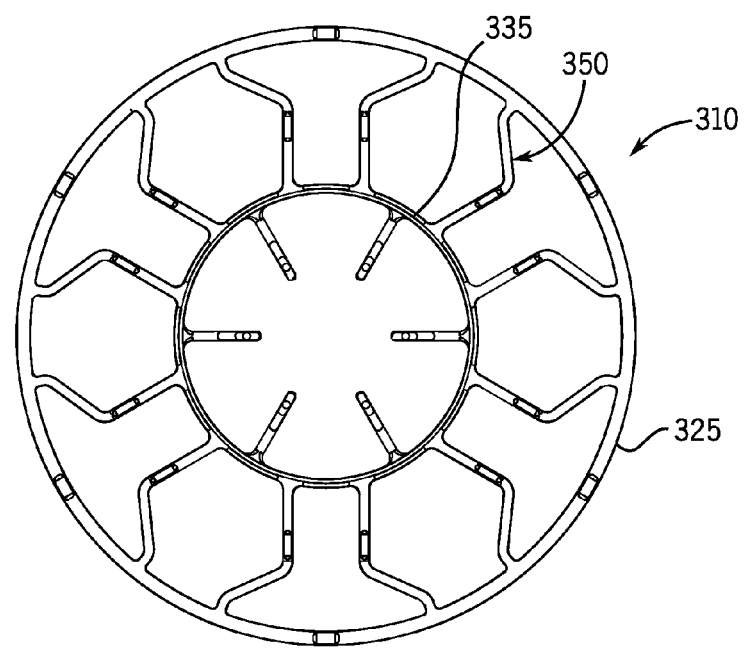
FIG. 16 is a top view of a spacer, according to various embodiments.
Figure 17:
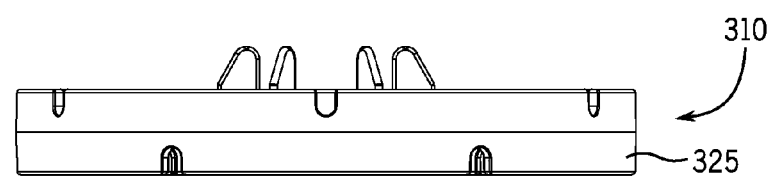
FIG. 17 is a side view of a spacer, according to various embodiments.

Referring now to FIGS. 15-17, in one or more examples of embodiments, spacer member 310 is a molded, durable plastic, or polyethylene, and/or may be formed to be resistant to one or more contaminants. Spacer member 310 may be made from plastics. In various embodiments, spacer member 310 is made (e.g., molded) from a thermoplastic such a chlorinated polyvinyl chloride (CPVC). In various embodiments, spacer member 310 is made (e.g., molded) from Fortron polyphenylene sulfate (PPS). The spacer member or portions thereof may be made of titanium (e.g., titanium sheet metal). The spacer member made of conductive material such as titanium, however, may also include non-conductive mounting points for photoelectrodes and/or counterelectrodes in electrical contact therewith to prevent electrical shorting.

In various embodiments, spacer member 310 includes one or more dividers 350 extending between a peripheral concentric portion 325 and an axial concentric portion 335. Divider 350 is adapted to help direct, redirect, mix, stir or otherwise influence solution as it passes through the spacer. Such mixing or flow may be advantageous in many ways. For example, such mixing or flow may help to mix oxidants generated by the device into the solution. As another example, such mixing or flow may increase the residence time of the solution in the cavity of the device for even a solution of moderate velocity. It should also be noted that any number of spacers 310 may be utilized anywhere within the cavity. In various embodiments, spacer 310 allows for flanges to be provided along the length of each counterelectrode or cathode on either or both edges of the counterelectrode or cathode to help create a counterelectrode surface that is substantially parallel or otherwise aligned with a surface of the first and/or second photoelectrode or anode. In various embodiments, the spacer has an optimal or minimal cross-sectional area to optimize or minimize any restrictions on flow through the device or apparatus.

Figure 18:
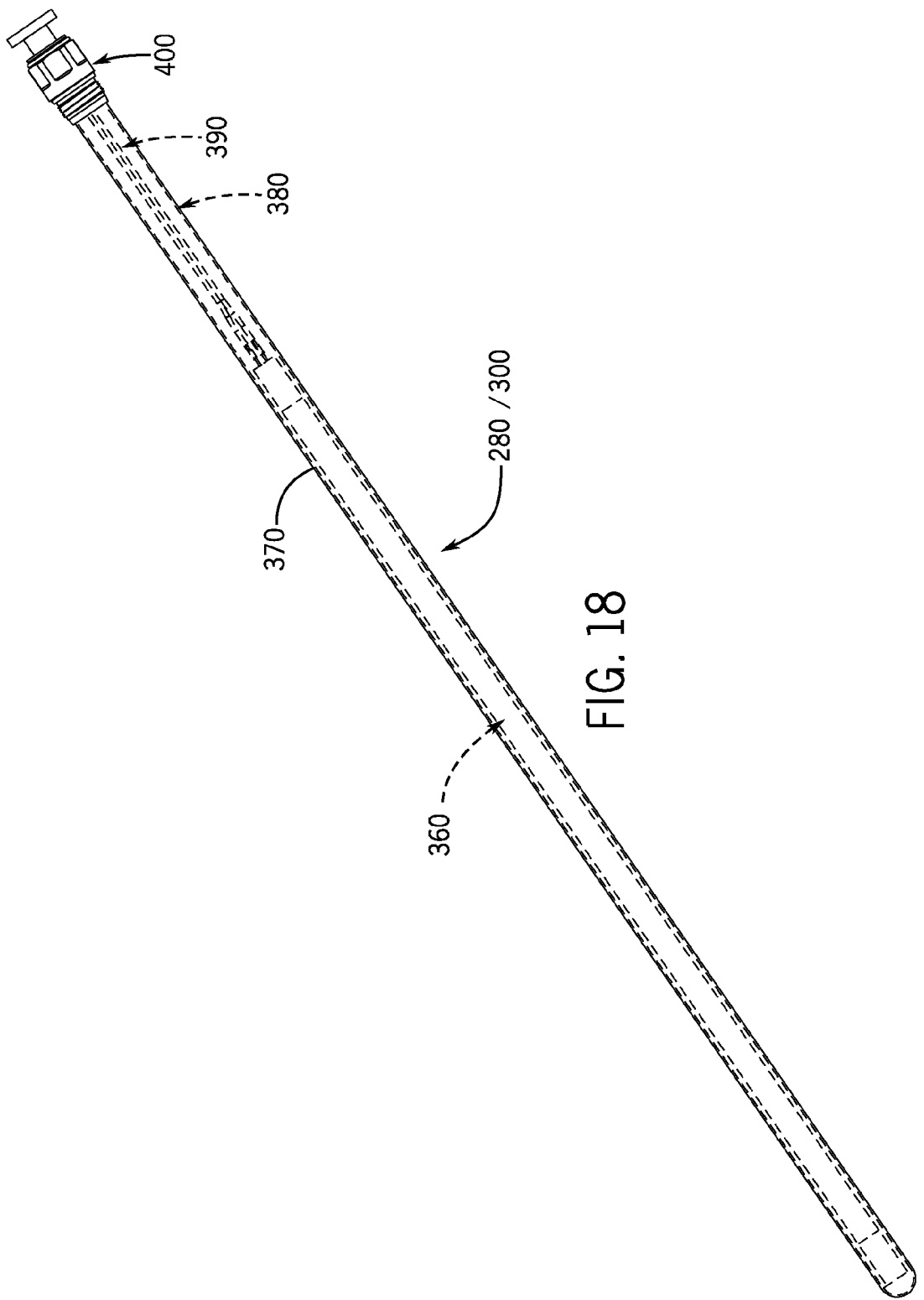
FIG. 18 is an isometric view of a light source assembly, according to various embodiments.
Figure 19:
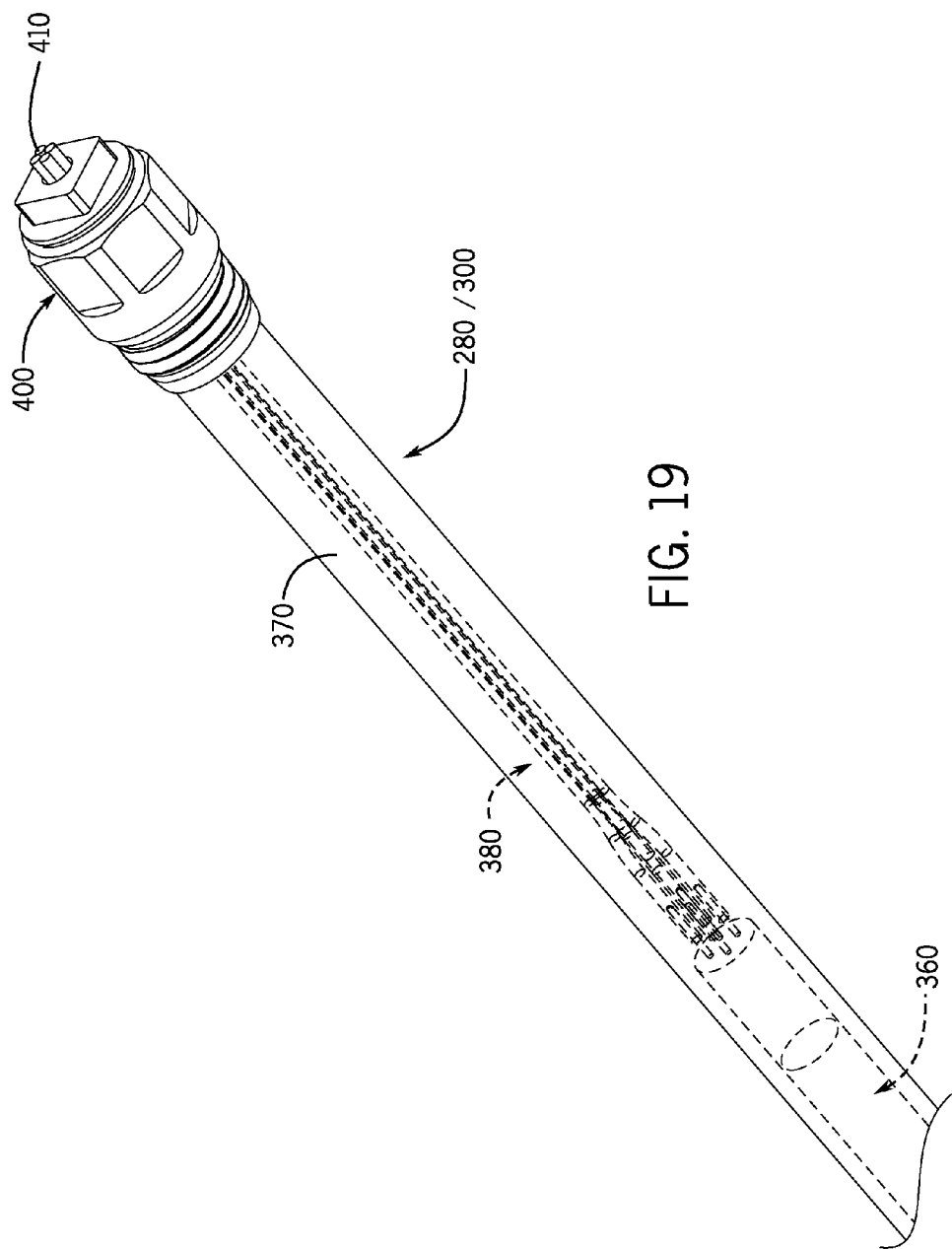
FIG. 19 is a partial isometric view of the light source assembly shown in FIG. 18, according to various embodiments.

Referring now to FIGS. 18-19, first and second light source assemblies 280/300 include a light source 360 (e.g., a UV light) and a light tube or sleeve 370. The light tube or sleeve may be formed of any material suitable for the purposes provided. For example, the light tube or sleeve may be UV-transparent material, such as, but not limited to, plastic or glass, or combinations of materials including such UV-transparent and/or UV-translucent material. In one or more examples of embodiments, light tube or sleeve 340 is made of quartz. Alternatively, the light source assemblies may not include a light tube or sleeve.

In various embodiments, light tube or sleeve 370 includes at least one wall or sidewall 380 that helps define a tube cavity 390 that at least partially houses and/or is at least partially adapted to receive one or more light sources 360 (e.g., an ultraviolet (UV) light source, light, or lamp). For example, a UV-light bulb or bulbs may be provided or inserted into the tube cavity. In various embodiments, light source 360 is provided and/or extends a distance into tube cavity 390, such that the light (e.g., UV) provided thereby may be exposed to one or more of the first and second photoelectrodes (and/or one or more photoelectrodes may be exposed to UV), illuminating or radiating to some or all of a surface thereof according to the various embodiments described herein. In various embodiments, each light tube or sleeve 370 is coupled to an adapter or end cap 400.

In various embodiments, end cap or adapter 400 is provided around and coupled (e.g., glued) to an end of light tube or sleeve 370. In various embodiments, adapter or end cap 400 defines an aperture through which sensors and wiring 410 (e.g., wiring for powering a UV light source) and other connections may be provided. In various embodiments, at least a portion of adapter 400 is threaded. Any threads along with various seals (e.g., O-rings) help prevent fluid from leaking while also allowing each light source assembly to be removable from the reactor assembly (e.g., for repair, replacement, etc.).

In various embodiments, the end cap or adapter further includes a gland cap. In various embodiments, wires are potted or otherwise sealed to the gland cap or adapter. In various embodiments, the gland cap provides a fluid seal in the event of a break or leak of the light tube or sleeve. In various embodiments, the gland cap is screwed into threads provided in an aperture defined by the end cap or adapter. In various embodiments, an O-ring is provided between the end cap and the gland cap to provide a seal to prevent fluid from leaking outside of the cavity. In various embodiments, an additional seal such as a epoxy bead may be provided between the end cap and the light tube or sleeve.

The light source may be provided or inserted into a socket provided in the adapter and may be secured in position. Each light source is further coupled or connected (e.g., electrically connected via wiring 410 or a socket), or adapted to be coupled or connected, to a source of power. In various embodiments, the light source or UV bulb is coupled or connected (e.g., electrically) via one or more cables or wires to one or more ballasts and/or power sources. In various embodiments, light source 360 extends into at least a majority of each light tube or sleeve 370. However, in various embodiments, the light source may extend only partially or not at all into the light tube or sleeve.

In various embodiments, light source 360 is a high irradiance UV light bulb. In one or more further examples of embodiments, light source 360 is a germicidal UV bulb with a light emission in the range of 400 nanometers or less, and more preferably ranging from 250 nanometers to 400 nanometers.

In various embodiments, the ultraviolet light of light source 360 has a wavelength in the range of from about 185 to 380 nm. In one or more examples of embodiments, light source 360 is a low pressure mercury vapor lamp adapted to emit UV germicidal irradiation at 254 nm wavelength. In one or more alternative examples of embodiments, a UV bulb with a wavelength of 185 nm may be effectively used as the light source. Various UV light sources, such as those with germicidal UVC wavelengths (peak at 254 nm) and blacklight UVA wavelengths (UVA range of 300-400 nm), may also be utilized. In one or more examples of embodiments, an optimal light wavelength (e.g., for promoting oxidation) is 305 nm. However, various near-UV wavelengths are also effective. Both types of lamps may emit radiation at wavelengths that activate photoelectrocatalysis. The germicidal UV and black light lamps are widely available and may be used in commercial applications of the instant PECO device.

In one or more additional examples of embodiments, light source 360 is adapted to emit an irradiation intensity in the range of 1-500 mW/cm$^2$. The irradiation intensity may vary considerably depending on the type of light source used. Higher intensities may improve the performance of the device (e.g., PECO device). However, the intensity may be so high that the system is UV-saturated or swamped and little or no further benefit is obtained. That optimum irradiation value or intensity may depend, at least in part, upon the distance between the lamp and one or more photoelectrodes.

The intensity (i.e., irradiance) of UV light at the photoelectrode may be measured using a photometer available from International Light Technologies Inc. (Peabody, Mass.), e.g., Model IL 1400A, equipped with a suitable probe. An example irradiation is greater than 3 mW/cm$^2$.

UV lamps typically have a "burn-in" period. UV lamps may also have a limited life (e.g., in the range of approximately 6,000 to 10,000 hours). UV lamps also typically lose irradiance (e.g., 10 to 40% of their initial lamp irradiance) over the lifetime of the lamp. Thus, it may be important to consider the effectiveness of new and old UV lamps in designing and maintaining oxidation values.

The light source may be disposed exterior to the light tube or sleeve, and the tube or sleeve may include a transparent or translucent member adapted to permit ultraviolet light emitted from the light source to irradiate the photoelectrode. The device may also utilize sunlight instead of, or in addition to, the light source.

Figure 20:
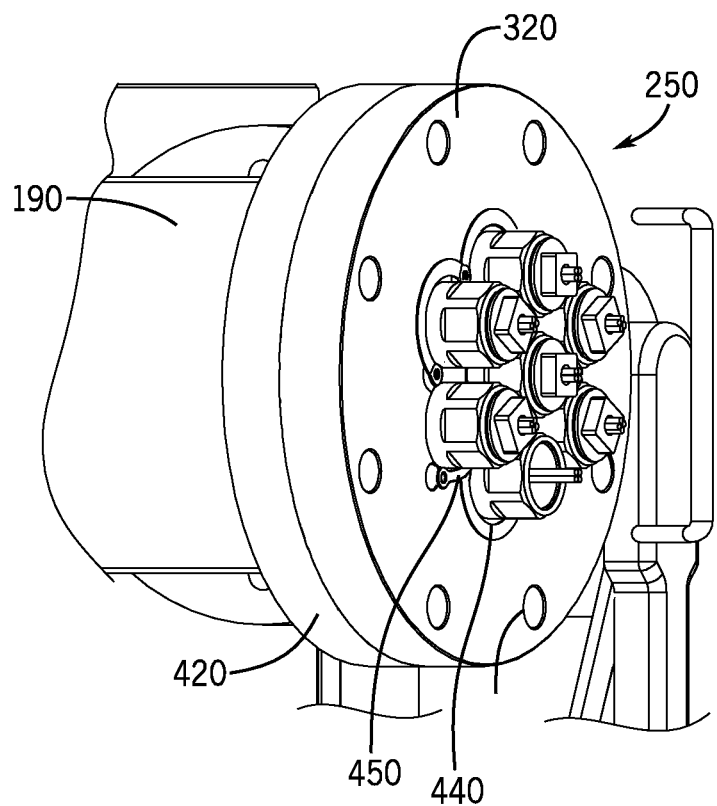
FIG. 20 is a partial isometric view of a PECO system, according to various embodiments.
Figure 21:
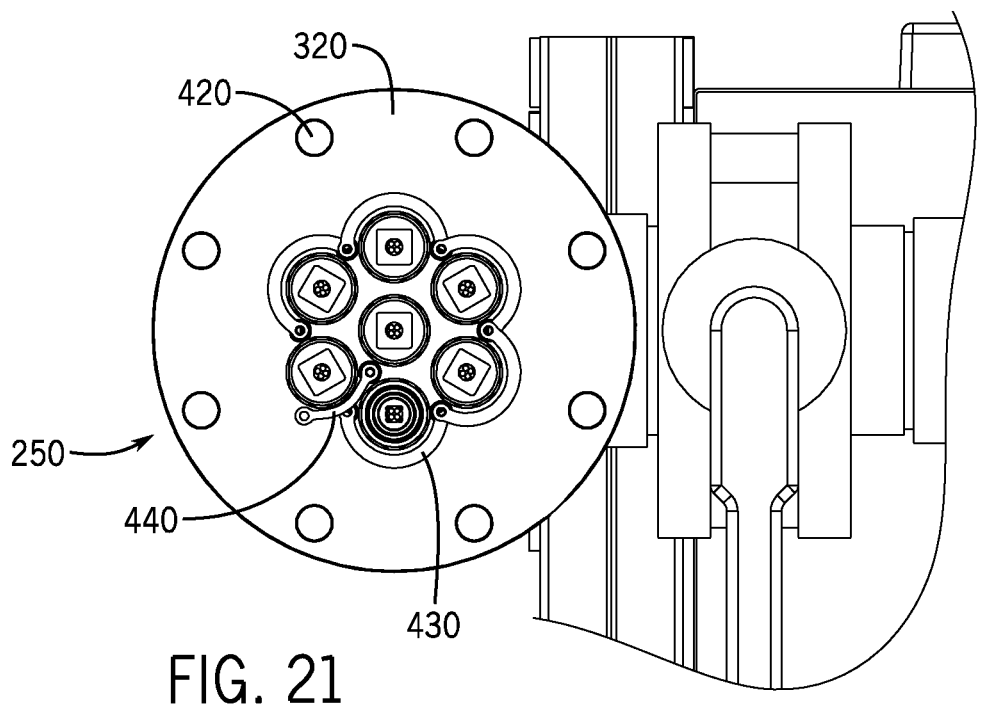
FIG. 21 is a partial side view of a PECO system, according to various embodiments.
Figure 22:
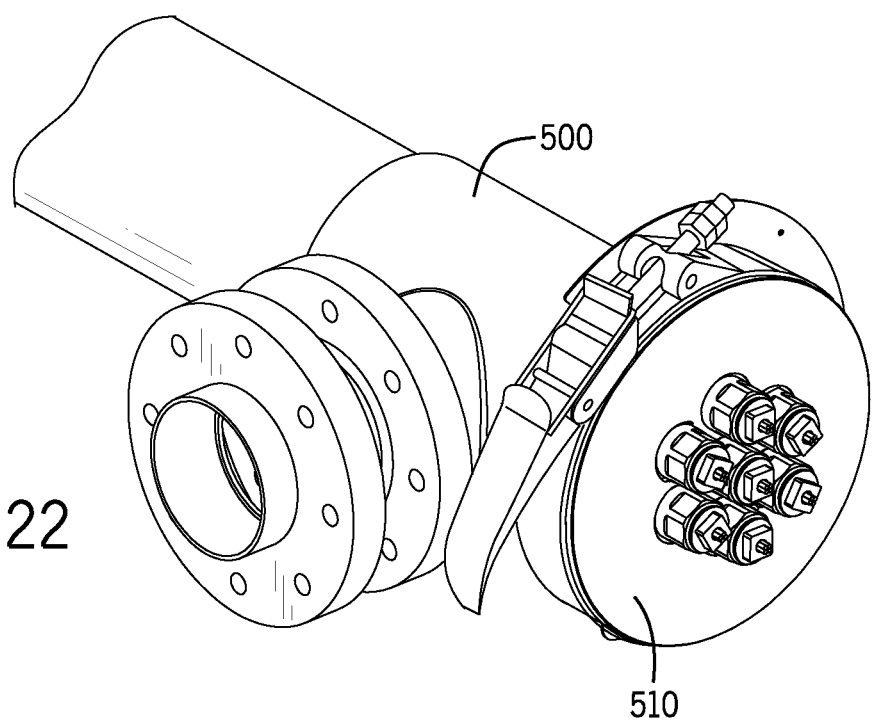
FIG. 22 is a partial isometric view of a PECO apparatus, according to various embodiments.
Figure 23:
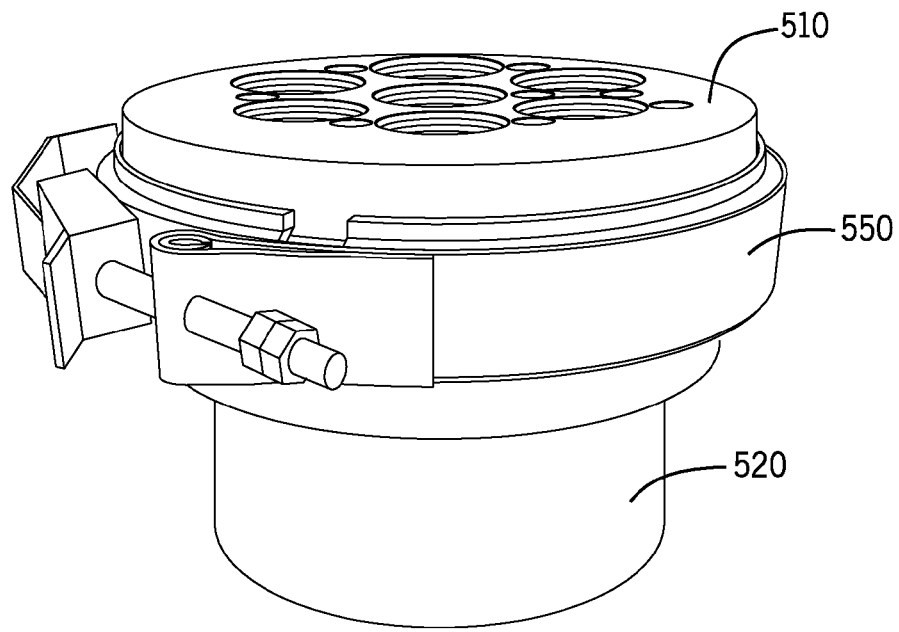
FIG. 23 is an isometric view of a bulkhead member, spigot member, band and clamp, according to various embodiments.
Figure 24:
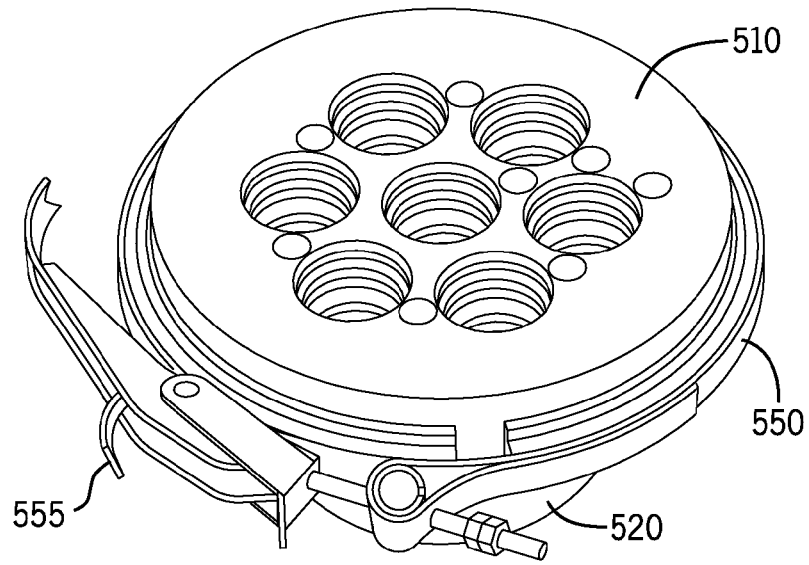
FIG. 24 is an isometric view of a bulkhead member, spigot member, band and clamp, according to various embodiments.
Figure 26:
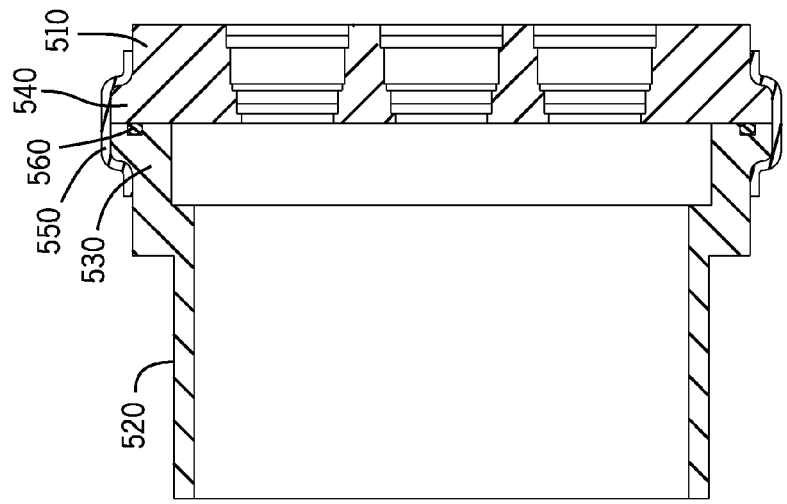
FIG. 26 is a cross-sectional view of the bulkhead member and band illustrated in FIG. 25, according to various embodiments.
Figure 25:
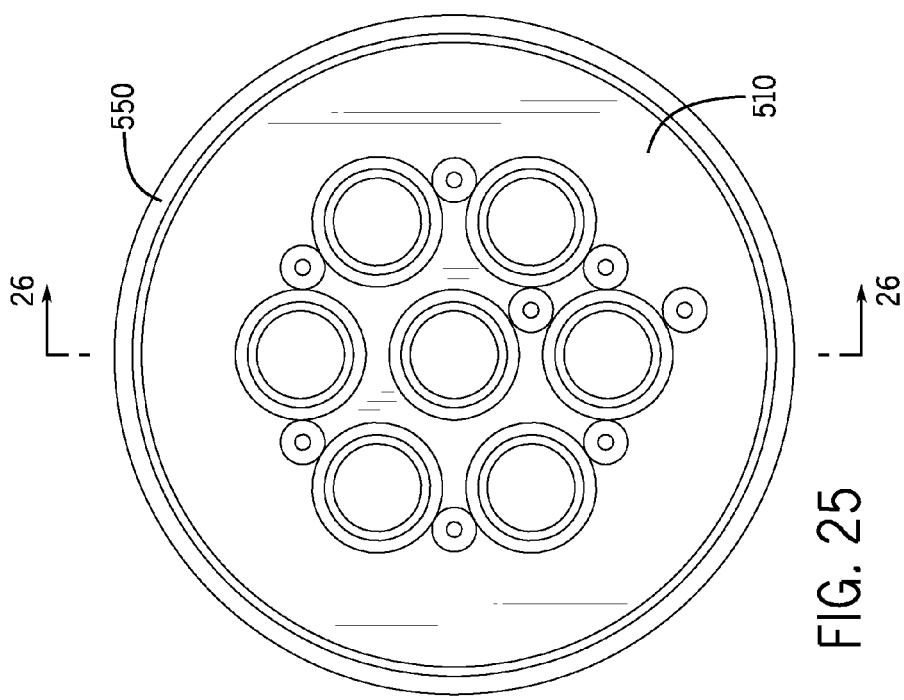
FIG. 25 is a top view of a bulkhead member and band, according to various embodiments.

Referring now to FIGS. 20-21, in various embodiments, the light source assemblies are provided (e.g., threaded) through the light source apertures of bulkhead member 320 such that the light tubes or sleeves are provided within (e.g., within the cavity) and spaced from the wall(s) of the housing. In various embodiments, each light tube or sleeve is adapted to disburse, distribute or otherwise transport or provide light over some, most, or all of the length of the light tube or sleeve, and/or some, most, or all of a length of the cavity. In various embodiments, at least one light tube or sleeve is substantially central to and/or substantially concentric within and spaced from the wall(s) (e.g., cylindrical walls) of the housing. In other embodiments, such as where the walls or cavity of the housing are not cylindrical, at least one light tube or sleeve is substantially centrally-located and spaced from one or more of the walls.

In various embodiments, fitting 190 includes a fitting flange 420 to which bulkhead member 320 is coupled or releasably coupled. Fitting flange 420 may be integral to the fitting or part of a component coupled to fitting 190. In various embodiments, fitting flange 420 and bulkhead member 320 each defines one or more flange apertures 430 into which bolts or other fasteners (not shown) may be provided to help releasably couple and create a seal between bulkhead member 320 and fitting flange 420.

In various embodiments, multiple counterelectrodes may be electrically-coupled together (e.g., with first bus bars 440 or other conductive material (such as stainless steel)). In addition, multiple photoelectrodes may be electrically-coupled together with one or more second bus bars 450 or other conductive material. It should be appreciated that the bus bars may also be provided internally to a reactor apparatus (e.g., to help protect them from damage, to reduce potential leaking, etc.). If provided internally, the bus bars may be made of titanium.

In various embodiments, and referring now to FIGS. 22-28, a second embodiment of a fitting 500 and bulkhead member 510 is shown. In various embodiments, bulkhead member 510 is coupled to a spigot member 520 coupled to fitting 500. As shown in FIGS. 8-10, spigot member 520 includes a spigot flange 530 and bulkhead member 510 includes a bulkhead flange 540, which flanges 530/540 may be releasably compressed together utilizing a clamp 550 (e.g., V-band clamp). While not commonly used with PVC flanges, the V-band clamp may be utilized as desired (e.g., where frequent access is required, or where space is limited) in connection with certain flange configurations disclosed herein such as those shown in the Figures. In various embodiments, a relatively wide or extra wide, deep V-band flange profile is utilized to allow for extra flange depth and shear section and provide added seal strength. As shown, in various embodiments, clamp 550 is a V-band clamp style (e.g., over center handle style clamp) to provide quick or easy access. In various embodiments, clamp 550 also includes multiple segments (e.g., three segments) to allow for greater flexibility for installation and removal. In various embodiments, clamp 550 is provided with a T-bolt quick release latch. It should be appreciated, however, that any number of clamp and latch styles, segment configurations, and profiles may be utilized. The clamp may be provided with a lubricant such as a dry film lubricant to help evenly distribute the clamp pressure around the flanges and reduce any need to provide a lubricant on the flanges themselves. In various embodiments, clamp 550 also includes a secondary latch 555 to prevent the inadvertent or unintended release of clamp 550.

Figure 28:
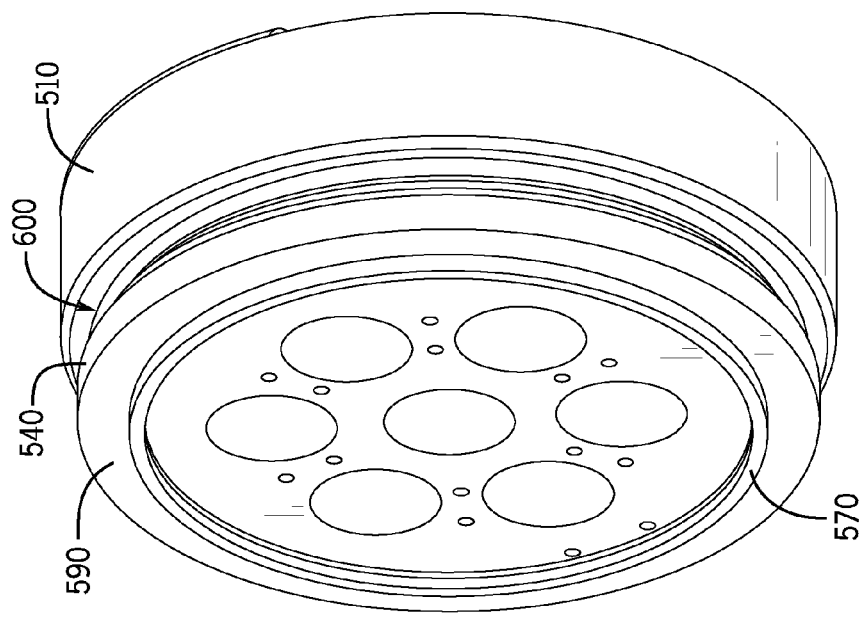
FIG. 28 is an isometric view of a bulkhead member, according to various embodiments.
Figure 27:
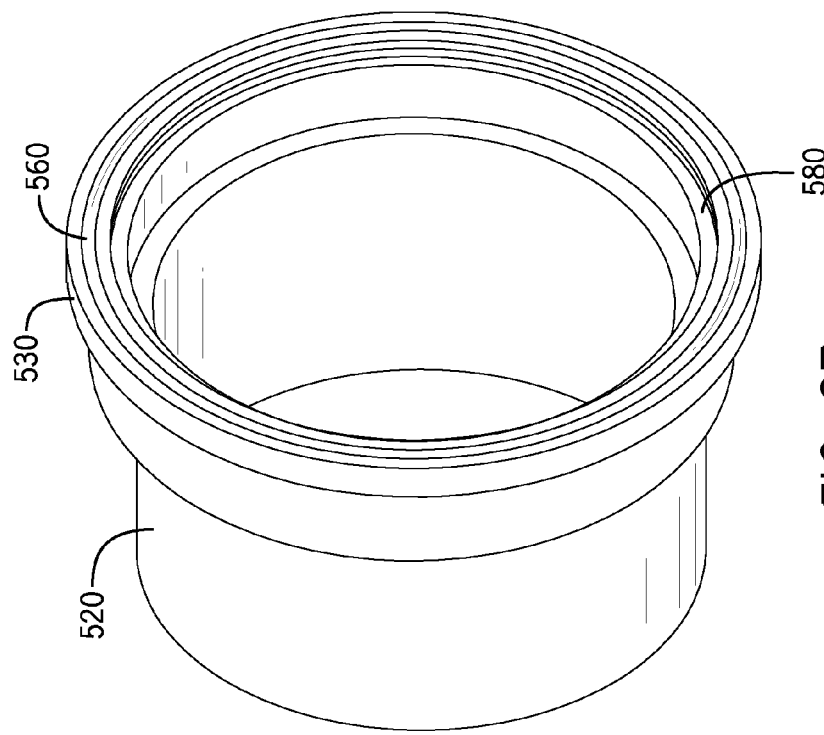
FIG. 27 is an isometric view of a spigot member and seal, according to various embodiments.

As shown in FIGS. 27-28, in various embodiments, spigot member 520 includes a spigot flange 530 (e.g., Van Stone spigot flange), and bulkhead member 510 includes a bulkhead flange 540 (e.g., mating flange). It should also be appreciated, however, that any variety of flange styles may be utilized. In various embodiments, a seal 560 (e.g., O-ring seal) is provided between spigot member 520 and bulkhead member 510 (e.g., when assembled or compressed together). In various embodiments, the spigot member or bulkhead member may also define a feature (e.g., a dovetail feature such as an undercut dovetail) to help retain seal 560 (e.g., an O-ring) relative to spigot member 520 and/or bulkhead member 510.

In various embodiments, spigot member 520 and bulkhead member 510 also includes a tongue and groove feature. For example, in various embodiments, bulkhead member 510 may include a tongue or ring 570 that, when bulkhead member 510 is properly aligned with spigot member 520, will fit into a groove or channel 580 defined by spigot member 520 to help align (e.g., coaxially align) spigot member 520 and bulkhead member 510 relative to each other. Such ring 570 or inner ring may also help protect a sealing face 590 of bulkhead member 510 during shipping and handling. In various embodiments, the seal 560 is provided on spigot member 520 or flange 530 to allow easy visual access for inspection and cleaning of seal 560 to help ensure particular contaminants which may compromise the integrity of seal 560 are removed during servicing. A seal (e.g., O-ring) may be provided on the bulkhead flange as an alternate or additional configuration.

The configuration of the clamp, spigot member 520, and mating bulkhead member 510 may also improve ease of removal of system components, such as a reactor assembly coupled to or otherwise associated with or including bulkhead member 510. For example, spigot 520 and/or spigot flange 530 may be shaped and sized to allow the clamp to be rested on or around spigot member 520 (e.g., next to spigot flange 530) during removal and installation of bulkhead member 510. In addition, in various embodiments, a profile of bulkhead flange 540 provides an area or feature 600 that may be utilized to better grip bulkhead member 510 when removing it from the apparatus or otherwise relative to spigot member 520.

In various embodiments, one or more power supplies and/or ballasts are included or provided for powering each light source and/or for providing an electrical potential or bias to one or more of the counterelectrodes (e.g., cathodes) and photoelectrodes (e.g., anodes). In various embodiments, one or more power supplies and/or ballasts are electrically coupled to the light sources and/or the photoelectrodes and provided externally to the container, housing or apparatus. At least one pump may optionally be provided internally or externally to the housing to help facilitate transfer or movement of fluid or solution through each apparatus or a system of apparatus. The pump may also be used, for example, for circulation or recirculation.

Referring again to FIG. 1, an electrical or control panel 450 according to one or more examples of embodiments is shown. In various embodiments, electrical or control panel 450 includes one or more of the following: power supplies, controls and/or lamps for one or more PECO apparatus and a master control and lamp. In various embodiments, the control panel may also include a event indicator lamp and reset control. In various embodiments, the control panel may be utilized to implement and/or operate one or more of the apparatus, devices, systems, and/or methods described herein.

In various embodiments, control panel 450 may also include one or more user interfaces 460. For example, in various embodiments, user interface 460 is used to configure, set-up, monitor and/or maintain one or more of the apparatus or systems described herein. The user interface may include a button or other control for implement a sampling of solution. For example, it may be desirable to sample solution before and after it is treated using an apparatus, device, system or method described herein. For example, in various embodiments, the apparatus or system includes two valves, one provided about at or about an input line for the apparatus or system, and the other provided about an output line for the apparatus or system. Such valves may be opened to help collect solution samples. These samples may tested on-site and/or off-site (e.g., sent to a laboratory for testing). The testing may involve chemical analysis and/or biologic analysis (e.g., to determine bacteria counts and/or "xxx log kill" measurements).

Because such testing may be affected by polarity applied or provided to electrodes at the time of sampling and because testing results may be more accurate if sampling is conducted at a time when polarity is consistent between samples, the user interface in various embodiments may include a button or control (e.g., "START SMPL PROCESS" button) for placing the system or apparatus in a particular state of polarity (e.g., a positive or normal polarity or bias) for a predetermined or desired time period (e.g., two minutes) to allow sampling to occur during that time period.

In various embodiments, power supplies, ballasts, circuit boards and/or controls may be housed or otherwise provided in the electrical or control panel. The PECO system may also include temperature sensors provided at various positions (e.g., in each group of devices). In various embodiments, the electrical panels may include fans and/or heat sinks if desired. In various embodiments, the electrical panels may be provided in an environment away from hazardous or flammable reactions.

One or more power supplies may also be provided for supplying power to one or more UV lamps. One or more power supplies, or an alternative power supply may also be provided for providing an applied voltage between the photoelectrode and counterelectrode. In one or more examples of embodiments, increasing the applied voltage increases photocurrent and/or chlorine production. In various embodiments, the applied voltage between the photoelectrode and the counterelectrode is provided to help ensure that electrons freed by photochemical reaction move or are moved away from the photoelectrode. The power supply may be an AC and/or DC power supply and may include a plurality of outputs.

One or more power supplies, in one or more examples of embodiments, may be connected to a power switch for activating or deactivating the supply of power. In one or more further examples of embodiments, a power supply, UV lamps, and or electrodes, may be connected to or in communication with programmable logic controller or other control or computer for selectively distributing power to the UV lamps and/or to the electrodes, including anodes and cathodes described herein.

In various embodiments, one or more power supplies are external to the system. However, one or more power supplies may be internal to the system (e.g., in an electrical panel or box coupled to the device(s)).

The power supply or an additional power supply may be connected to the terminals of the electrodes described hereinabove via, for example cable connection to the terminals, for providing a current, potential, voltage or bias to the electrodes as described in the described methods.

A temperature probe(s) or sensor(s) may also be provided in one or more examples of embodiments. For example, the temperature probe(s) may be positioned in the housing or the adapter of the UV light assembly. The temperature probe may monitor the temperature in the device or in the fluid within the respective device and communicate that temperature reading. Further the temperature probe may be in communication with a shut-off switch or valve which is adapted to shut the system down upon reaching a predetermined temperature.

A fluid level sensor(s) may also be provided which may communicate a fluid level reading. The fluid level sensor(s) may be positioned in the device. Further the fluid level sensor may be in communication with a shut-off switch or valve which is adapted to shut off the device or increase the intake of fluid into the device upon reaching a predetermined fluid value.

In one or more examples of embodiments, the device includes a carbon filter adapted to filter chlorine from the water. In various embodiments, the device includes a computer adapted to send one or more controlled signals to the existing power supplies to pulse the voltage and current.

In operation of the foregoing example embodiment, generally, in various embodiments, a method for reducing the level or amount of one or more contaminants in solution or fluid described includes introducing the solution into a housing or container or cell including: at least one light source; at least one photoelectrode (e.g., anode), wherein the at least one photoelectrode includes an anatase polymorph of titanium, a rutile polymorph of titanium, or a nanoporous film of titanium dioxide; and at least one counterelectrode (e.g., cathode). In various embodiments, flow of fluid or solution is facilitated past or along one or more photoelectrodes and/or counterelectrodes of a PECO apparatus. In various embodiments, one or more photoelectrodes are irradiated with UV light, and a first potential or bias is applied to one or more photoelectrodes and one or more counterelectrodes for a first period of time. In various embodiments, a second potential or bias is applied to the one or more photoelectrodes and counterelectrodes for a second period of time. As a result, in various embodiments, a contaminant level or amount in the solution introduced into the housing is reduced.

Contaminated fluid, such as contaminated water, may be pumped or otherwise provided or directed into an apparatus, or system. The water may be circulated and/or recirculated within the device. Multiple units, or reactors, may be connected and operated in series, which may result in increased space and time for contaminated fluid in the reactor(s) or device(s). Upon completion of processing, in various embodiments, the water exits the device ready for use, or circulated or recirculated through the device, one or more other devices, or system of devices, for further treatment or purification.

In various embodiments, in operation, the $TiO_2$ photocatalyst is illuminated with light having sufficient near UV energy to generate reactive electrons and holes promoting oxidation of compounds on the anode surface.

Any temperature of aqueous solution or liquid water is suitable for use with the exemplary embodiments of the device such as the instant PECO devices. In various embodiments, the solution or water is sufficiently low in turbidity to permit sufficient UV light to illuminate the photoelectrode.

In various embodiments, photocatalytic efficiency is improved by applying a potential (i.e., bias) across the photoelectrode and counterelectrode. Applying a potential may decrease the recombination rate of photogenerated electrons and holes. In various embodiments, an effective voltage range applied may be in the range of −1 V to +15 V. In various embodiments, an electrical power source is adapted to apply an electrical potential in the range of 4 V to 12 V across the photoelectrode and counterelectrode. In various embodiments, the electrical power source is adapted to generate an electrical potential in the range of 1.2 V to 3.5 V across the photoelectrode and counterelectrode (or, 0 to 2.3 V vs. the reference electrode).

For various applications, including, for example fracking fluid or high-salinity applications, it may be desirable to reverse (e.g., periodically or intermittently) the potential, bias, polarity and/or current applied to or between the photoelectrode and the counterelectrode (e.g., to clean the photoelectrode and/or counterelectrode, or to otherwise improve the performance of the photoelectrode, counterelectrode, or device). In various embodiments, by reversing the potential, bias, polarity and/or current, the photoelectrode is changed (e.g., from an anode) into a cathode and the counterelectrode is changed (e.g., from a cathode) into an anode. In various embodiments, circuit boards utilized by the device or system of devices may be utilized to reverse the bias as described.

For example, in various embodiments, initially positive voltage is electrically connected to a positive charge electrode and negative voltage is electrically connected to a negative charge electrode. After a first period of time, the positive voltage is electrically connected to the negative charge electrode and the negative voltage is electrically connected to the positive charge electrode. After a second period of time, the positive voltage is electrically connected back to the positive charge electrode and the negative voltage is electrically connected back to the negative charge electrode. This reversal process may be repeated as necessary or desired.

The length of the first period of time and the second period of time may be the same. In various embodiments, however, the length of the first period of time and the second period of time are different. In various embodiments, the first period of time is longer than the second period of time.

The length of the first and second periods of time depends on a variety of factors including salinity, application, voltage, etc. For example, fracking fluid or high salinity fluid applications may require relatively more frequent reversal of potential, bias, polarity and/or current compared to fresh water applications. In various embodiments, the lengths of the first period of time relative to the second period of time may be in a ratio of from 3:1 to 50:1, and in one or more further embodiments from 3:1 to 25:1, and in one or more further embodiments from 3:1 to 7:1. For example, in various embodiments, the first period of time and second period of time is about 5 minutes to about 1 minute. Fresh water applications may require relatively less frequent reversal of potential, bias, polarity and/or current, and the lengths of the first period of time relative to the second period of time may be in a ratio of from 100:1 to 10:1. For example, in various embodiments, the first period of time and second period of time is about 60 minutes to a range of about 1 minute to about 5 minutes.

In various embodiments, the voltage applied between the photoelectrode and counterelectrode may not change during the first period of time of normal potential and during the second period of time of reverse potential. For example, in various embodiments (e.g., where the photoelectrode includes titanium and the apparatus and/or method are adapted for treatment of fracking or other high salinity solution) the voltage applied during the first period of time may be less than 9V (e.g., about 7.5V) and the voltage applied during the second period of time may be less than 9V (e.g., about 7.5V). In other various embodiments (e.g., where the photoelectrode includes titanium and the apparatus and/or method are adapted for treatment of fresh water) the voltage applied during the first period of time may be greater than 9V (e.g., about 12V) and the voltage applied during the second period of time may be greater than 9V (e.g., about 12V).

Maintaining the voltage in the first period of time and the second period of time may help to maintain and/or un-foul the photoelectrode to help make it more effective for removing contaminants through photoelectrocatalytic oxidation during the first period of time. However, maintaining the voltage under 9V in each period of time may cause a momentary disturbance in the removal of contaminants during the second period of time. For a variety of reasons, (e.g., to help minimize any such disturbance and/or to help cause electroprecipitation and/or electrocoagulation), in various embodiments, it may be advantageous to apply higher voltages (e.g., voltages greater than 9V) during the first period of time and second period of time. In various embodiments, applying higher voltages helps to promote an electrochemical process such as electroprecipitation and/or electrocoagulation during the second period of time, which process can help minimize any disturbance in removal of contaminants during the second period of time as well as offer advantages and benefits of such a process.

In various embodiments, the voltage is adjusted to control the rate of dissolution of the electrode. In various examples of embodiments, the voltage applied during the first period of time may be more than 9V (e.g., about 12V) and the voltage applied during the second period of time may be more than 9V (e.g., about 12V). Higher voltages may help optimize the effectiveness of the device in certain ways. Higher voltages may also lead to electroprecipitation or electrocoagulation of contaminants within or from the fluid. However, such higher voltages may also lead to anodic dissolution such as pitting and other degradation of the photoelectrode and/or counterelectrode, which may necessitate more frequent servicing of the PECO device (e.g., replacement of the photoelectrode (e.g., the foil) and counterelectrode).

In various embodiments, it may be advantageous (e.g., to help limit any anodic dissolution, or pitting or other degradation of the photoelectrode) to apply relatively lower voltages during the first period of time and relatively higher voltages during the second period of time. In various embodiments, e.g., in a fracking fluid application using a photoelectrode and a counterelectrode including titanium, the voltage applied during the first period of time may be less than 9V (e.g., about 7.5V) and the voltage applied during the second period of time may be more than 9V (e.g., about 12V for fracking fluid or higher salinity applications, to about 14V for fresh water applications). In various embodiments, during application of relatively lower voltage during the first period of time, contaminants are degraded (or the removal of contaminants is promoted) by photoelectrocatalytic oxidation, and during application of a relatively higher voltage during the second period of time, contaminants are degraded (or the removal of contaminants is promoted) by an electrochemical process such as electroprecipitation and/or electrocoagulation.

In various embodiments, during the second period of time, the counterelectrode or sacrificial electrode of titanium is dissolved at least in part by anodic dissolution. It is believed that a range of coagulant species of hydroxides are formed (e.g., by electrolytic oxidation of the sacrificial counterelectrode), which hydroxides help destabilize and coagulate the suspended particles or precipitate and/or adsorb dissolved contaminants.

In various embodiments, it is advantageous to apply relatively higher voltages during the first period of time and relatively lower voltages during the second period of time. In various embodiments, the voltage applied during the first period of time is more than 9V (e.g., about 12V) and the voltage applied during the second period of time is less than 9V (e.g., about 7.5V).

In various embodiments, the main reaction occurring at the counterelectrodes or sacrificial electrodes during the second period of time (e.g., during polarity reversal) is dissolution:

$$Ti_{(s)} \rightarrow Ti^{4+} + 4e^-$$

In addition, water is electrolyzed at the counterelectrode (or sacrificial electrode) and photoelectrode:

$$2H_2O + 2e^- \rightarrow H_{2(g)} + 2OH^- \quad \text{(cathodic reaction)}$$

$$2H_2O \rightarrow 4H^+ + O_{2(g)} + 4e^- \quad \text{(anodic reaction)}$$

In various embodiments, electrochemical reduction of metal cations ($Me^{n+}$) occurs at the photoelectrode surface:

$$Me^{n+} + ne^- \rightarrow nMe°$$

Higher oxidized metal compounds (e.g., Cr(VI)) may also be reduced (e.g., to Cr(III)) about the photoelectrode:

$$Cr_2O_7^{2-} + 6e^- + 7H_2O \rightarrow 2Cr^{3+} + 14OH^-$$

In various embodiments, hydroxide ions formed at the photoelectrode increase the pH of the solution which induces precipitation of metal ions as corresponding hydroxides and co-precipitation with metal (e.g., Ti) hydroxides:

$$Me^{n+} + nOH^- \rightarrow Me(OH)_{n(s)}$$

In addition, anodic metal ions and hydroxide ions generated react in the solution to form various hydroxides and built up polymers:

$$Ti^{4+} + 4OH^- \rightarrow Ti(OH)_{4(s)}$$

$$nTi(OH)_{4(s)} \rightarrow Ti_n(OH)_{4n(s)}$$

However, depending on the pH of the solution other ionic species may also be present. The suspended titanium hydroxides can help remove pollutants from the solution by sorption, co-precipitation or electrostatic attraction, and coagulation. For a particular electrical current flow in an electrolytic cell, the mass of metal (e.g., Ti) theoretically dissolved from the counterelectrode or sacrificial electrode is quantified by Faraday's law $$m = \frac{ItM}{zF}$$

where m is the amount of counterelectrode or sacrificial electrode material dissolved (g), I the current (A), t the electrolysis time (s), M the specific molecular weight (g mol$^{-1}$), z the number of electrons involved in the reaction and F is the Faraday's constant (96485.34 As mol$^{-1}$). The mass of evolved hydrogen and formed hydroxyl ions may also be calculated.

In various embodiments, it may be advantageous (e.g., to help limit any anodic dissolution, or pitting or other degradation of the photoelectrode) to apply certain voltages (e.g., relatively higher voltages) during the first period of time and different voltages (e.g., relatively lower voltages) during the second period of time. In various embodiments (e.g., in a fracking fluid application using a counterelectrode including aluminum), the voltage applied during the first period of time may be about 6V to 9V (e.g., about 7.5V) and the voltage applied during the second period of time may be about 0.6V-12V. In various embodiments, during application of relatively higher voltage during the first period of time, contaminants are degraded (or the removal of contaminants is promoted) by photoelectrocatalytic oxidation, and during application of a relatively lower voltage during the second period of time, contaminants are degraded (or the removal of contaminants is promoted) by and electrochemical process such electroprecipitation or electrocoagulation.

In various embodiments, during the second period of time, an aluminum counterelectrode or sacrificial electrode is dissolved at least in part by anodic dissolution. It is believed that a range of coagulant species of hydroxides are formed (e.g., by electrolytic oxidation of the sacrificial counterelectrode), which hydroxides help destabilize and coagulate the suspended particles or precipitate and/or adsorb dissolved contaminants.

In various embodiments, the main reaction occurring at the counterelectrodes or sacrificial electrodes during the second period of time (e.g., during polarity reversal) is dissolution:

$$Al_{(s)} \rightarrow Al^{3+} + 3e^-$$

Additionally, water is electrolyzed at the counterelectrode (or sacrificial electrode) and photoelectrode:

$$2H_2O + 2e^- \rightarrow H_{2(g)} + 2OH^- \quad \text{(cathodic reaction)}$$

$$2H_2O \rightarrow 4H^+ + O_{2(g)} + 4e^- \quad \text{(anodic reaction)}$$

In various embodiments, electrochemical reduction of metal cations ($Me^{n+}$) occurs at the photoelectrode surface:

$$Me^{n+} + ne^- \rightarrow nMe°$$

Higher oxidized metal compounds (e.g., Cr(VI)) may also be reduced (e.g., to Cr(III)) about the photoelectrode:

$$Cr_2O_7^{2-} + 6e^- + 7H_2O \rightarrow 2Cr^{3+} + 14OH^-$$

In various embodiments, hydroxide ions formed at the photoelectrode increase the pH of the solution which induces precipitation of metal ions as corresponding hydroxides and co-precipitation with metal (e.g., Al) hydroxides:

$$Me^{n+} + nOH^- \rightarrow Me(OH)_{n(s)}$$

In addition, anodic metal ions and hydroxide ions generated react in the solution to form various hydroxides and built up polymers:

$$Al^{3+} + 3OH^- \rightarrow Al(OH)_{3(s)}$$

$$nAl(OH)_{3(s)} \rightarrow Al_n(OH)_{3n(s)}$$

However, depending on the pH of the solution other ionic species, such as dissolved Al(OH)$^{2+}$, Al$_2$(OH)$_2^{4+}$ and Al(OH)$_4^-$ hydroxo complexes may also be present. The suspended aluminum hydroxides can help remove pollutants from the solution by sorption, co-precipitation or electrostatic attraction, and coagulation.

For a particular electrical current flow in an electrolytic cell, the mass of metal (e.g., Al) theoretically dissolved from the counterelectrode or sacrificial electrode is quantified by Faraday's law $$m = \frac{ItM}{zF}$$

where m is the amount of counterelectrode or sacrificial electrode material dissolved (g), I the current (A), t the electrolysis time (s), M the specific molecular weight (g mol$^{-1}$), z the number of electrons involved in the reaction and F is the Faraday's constant (96485.34 As mol$^{-1}$). The mass of evolved hydrogen and formed hydroxyl ions may also be calculated.

The present invention, in one or more examples of embodiments, is directed to methods of treating an aqueous solution having one or more contaminants therein to help remove or reduce the amounts of contaminants. In various embodiments, the method includes providing an aqueous solution comprising at least one contaminant selected from the group consisting of an organism, an organic chemical, an inorganic chemical, and combinations thereof and exposing the aqueous solution to photoelectrocatalytic oxidization.

In one example of an application of the device described herein, the device uses photoelectrocatalysis as a treatment method for fracking fluid. While typically described herein as reducing levels of or removing contaminants from fracking fluid, it should be understood by one skilled in the art that photoelectrocatalysis of other contaminants can be performed similarly using the device (e.g., photoelectrocatalytic oxidation or PECO device).

In various embodiments, one or more contaminants are oxidized by a free radical produced by a photoelectrode, and wherein one or more contaminants are altered electrochemically (e.g., by electroprecipitation or electrocoagulation). In various embodiments, one or more contaminants are oxidized by a chlorine atom produced by a photoelectrode. In various embodiments, one or more contaminants are altered electrochemically (e.g., by electroprecipitation or electrocoagulation).

In one or more embodiments, the apparatus and methods utilize photoelectrocatalytic oxidation, whereby a photocatalytic anode is combined with a counterelectrode to form an electrolytic cell. In various embodiments, when the instant anode is illuminated by UV light, its surface becomes highly oxidative. By controlling variables including, without limitation, chloride concentration, light intensity, pH and applied potential, the irradiated and biased $TiO_2$ composite photoelectrode may selectively oxidize contaminants that come into contact with the surface, forming less harmful gas or other compounds. In various embodiments, application of a potential to the photoelectrode provides further control over the oxidation products. Periodic or intermittent reversal of the potential may help further remove or reduce the amount of contaminants.

The foregoing apparatus and method provides various advantages. The device may be provided in a portable container (e.g., a mobile trailer), permitting on-site water or fluid decontamination. Further, the device is modular in design and can be easily combined with other devices as needed. The device is also easy to fabricate and includes electrical connections which are easy to make. The cathode may be positioned behind the anode and away from the scouring action of water flow, reducing or limiting scale accumulation. Additionally, any spacer or separator provided between the counterelectrode and photoelectrode reduces shorting caused by contact or proximity of the electrode. These and other advantages are apparent from the foregoing description and associated Figures.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that references to relative positions (e.g., "top" and "bottom") in this description are merely used to identify various elements as are oriented in the Figures. It should be recognized that the orientation of particular components may vary greatly depending on the application in which they are used.

For the purpose of this disclosure, the term "coupled" means the joining of two members directly or indirectly to one another. Such joining may be stationary in nature or moveable in nature. Such joining may be achieved with the two members or the two members and any additional intermediate members being integrally formed as a single unitary body with one another or with the two members or the two members and any additional intermediate members being attached to one another. Such joining may be permanent in nature or may be removable or releasable in nature.

It is also important to note that the construction and arrangement of the system, methods, and devices as shown in the various examples of embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements show as multiple parts may be integrally formed, the operation of the interfaces may be reversed or otherwise varied, the length or width of the structures and/or members or connector or other elements of the system may be varied, the nature or number of adjustment positions provided between the elements may be varied (e.g., by variations in the number of engagement slots or size of the engagement slots or type of engagement). The order or sequence of any process or method steps may be varied or re-sequenced according to alternative embodiments. Other substitutions, modifications, changes and omissions may be made in the design, operating conditions and arrangement of the various examples of embodiments without departing from the spirit or scope of the present inventions.

While this invention has been described in conjunction with the examples of embodiments outlined above, various alternatives, modifications, variations, improvements and/or substantial equivalents, whether known or that are or may be presently foreseen, may become apparent to those having at least ordinary skill in the art. Accordingly, the examples of embodiments of the invention, as set forth above, are intended to be illustrative, not limiting. Various changes may be made without departing from the spirit or scope of the invention. Therefore, the invention is intended to embrace all known or earlier developed alternatives, modifications, variations, improvements and/or substantial equivalents.

We claim:

1. An assembly for removing or reducing the level of contaminants in a solution comprising:
    a housing having a cavity wall defining a linear cavity that extends lengthwise from a first end near an inlet to an opposing second end near an outlet, the linear cavity having a central longitudinal axis, a midpoint and a length from the first end to the midpoint;

a first light source provided within the linear cavity and extending along the central longitudinal axis a majority of the length from the first end to the midpoint;

a plurality of second light sources provided within the cavity about a line concentric to the central longitudinal axis;

a first photoelectrode provided within the cavity between the first light source and plurality of second light sources;

a second photoelectrode provided within the linear cavity around the second light sources; and at least one counterelectrode provided between the first photoelectrode and the second photoelectrode;

wherein the first photoelectrode and second photoelectrode each comprise a primarily titanium foil support with titanium dioxide provided on at least one surface the photoelectrode; and wherein the first photoelectrode, second photoelectrode and at least one counterelectrode are each coupled to a respective terminal adapted to be electrically coupled to a power supply.

2. The assembly of claim 1, further comprising a bulkhead coupled to the at least one counterelectrode and first and second light sources.

3. The assembly of claim 1, wherein there at least three second light sources provided about a line concentric to the longitudinal axis of the first light source.

4. The assembly of claim 1, wherein there are five second light sources provided about a line concentric to the longitudinal axis of the first light source.

5. The assembly of claim 1, wherein there are six second light sources provided about a line concentric to the longitudinal axis of the first light source.

6. The assembly of claim 1, wherein the first and second light sources comprise a light sleeve and end cap and wherein the end cap is removeably coupled to the bulkhead member.

7. The assembly of claim 1, further comprising a spacer, the spacer comprising a peripheral concentric portion coupled to an axial concentric portion by at least one divider.

8. An assembly for removing or reducing the level of contaminants in a solution comprising:

a housing having a cavity wall defining a linear cavity that extends lengthwise between a first end near an inlet and an opposing second end near an outlet, the linear cavity having a central longitudinal axis, a midpoint and a length from the first end to the midpoint;

a plurality of light sources extending a majority of the length from the first end to the midpoint and spaced in a radial array around the central longitudinal axis between a first photoelectrode in the linear cavity and a second photoelectrode in the linear cavity; and at least one counterelectrode provided between the first photoelectrode and the second photoelectrode;

wherein the first photoelectrode and second photoelectrode each comprise a primarily titanium foil support having titanium dioxide provided on at least one surface the photoelectrode; and wherein the first photoelectrode, second photoelectrode and at least one counterelectrode are each coupled to a respective terminal adapted to be electrically coupled to a power supply.

9. The assembly of claim 8, further comprising a longitudinal axis and a light source provided about the longitudinal axis.

10. The assembly of claim 8, further comprising a bulkhead coupled to the at least one counterelectrode and the light sources.

11. The assembly of claim 8, wherein there are more than three light sources spaced in a radial array between a first photoelectrode and a second photoelectrode.

12. The assembly of claim 8, wherein there are five light sources spaced in a radial array between a first photoelectrode and a second photoelectrode.

13. The assembly of claim 8, wherein there are six light sources spaced in a radial array between a first photoelectrode and a second photoelectrode.

14. The assembly of claim 8, wherein the first and second light sources comprise a light sleeve and end cap and wherein the end cap is removeably coupled to the bulkhead member.

15. The assembly of claim 8, further comprising a spacer provided between the first photoelectrode and the second photoelectrode, the spacer comprising a peripheral concentric portion coupled to an axial concentric portion by at least one divider.

16. An apparatus for removing or reducing the level of contaminants in a solution comprising:

a housing member having a cavity wall defining a linear cavity that extends from a first end near an inlet to an opposing second end near an outlet, the linear cavity having a central longitudinal axis, a midpoint and a length from the first end to the midpoint;

a first light source provided within the cavity and extending substantially parallel to the central longitudinal axis a majority of the length from the first end to the midpoint;

a first photoelectrode provided between the first light source and a first point of the cavity wall;

a second photoelectrode provided between the first photoelectrode and the first point of the cavity wall;

a plurality of second light sources provided between the first photoelectrode and the second photoelectrode and extending substantially parallel to the central longitudinal axis; and a counterelectrode provided between the first photoelectrode and the cavity wall;

wherein the first photoelectrode and second photoelectrode each comprises a primarily titanium foil support with a layer of titanium dioxide provided on at least one surface the photoelectrode; and wherein the first photoelectrode, second photoelectrode and counterelectrode are each coupled to a respective terminal adapted to be electrically coupled to a power supply.

17. The apparatus of claim 16, wherein the first light source is provided about the cavity longitudinal axis.

18. The apparatus of claim 16, wherein the second light sources are spaced symmetrically around the cavity longitudinal axis.

19. The apparatus of claim 16, wherein the first photoelectrode is provided around the first light source.

20. The apparatus of claim 16, wherein the second photoelectrode is provided around the plurality of second light sources.

* * * * *